(12) United States Patent
Shin et al.

(10) Patent No.: US 9,893,394 B2
(45) Date of Patent: Feb. 13, 2018

(54) REAL-TIME BATTERY THERMAL MANAGEMENT FOR ELECTRIC VEHICLES

(71) Applicant: The Regents of The University of Michigan, Ann Arbor, MI (US)

(72) Inventors: Kang G. Shin, Ann Arbor, MI (US); Eugene Kim, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 491 days.

(21) Appl. No.: 14/676,326

(22) Filed: Apr. 1, 2015

(65) Prior Publication Data

US 2015/0280294 A1    Oct. 1, 2015

Related U.S. Application Data

(60) Provisional application No. 61/973,641, filed on Apr. 1, 2014.

(51) Int. Cl.
*H01M 10/625* (2014.01)
*H01M 10/613* (2014.01)
(Continued)

(52) U.S. Cl.
CPC ............ *H01M 10/625* (2015.04); *B60L 1/02* (2013.01); *B60L 3/0046* (2013.01); *B60L 3/12* (2013.01); *B60L 11/1803* (2013.01); *B60L 11/1857* (2013.01); *B60L 11/1861* (2013.01); *B60L 11/1866* (2013.01); *B60L 11/1874* (2013.01); *B60L 11/1877* (2013.01); *B60L 11/1879* (2013.01); *H01M 10/482* (2013.01); *H01M 10/486* (2013.01); *H01M 10/613* (2015.04); *H01M 10/615* (2015.04); *H01M 10/633* (2015.04); *H01M 10/6551* (2015.04); *B60L 2240/545* (2013.01); *B60L 2240/547* (2013.01); *B60L 2240/549* (2013.01); *B60L 2240/662* (2013.01); *B60L 2240/80* (2013.01);
(Continued)

(58) Field of Classification Search
None
See application file for complete search history.

(56) References Cited

U.S. PATENT DOCUMENTS

2009/0179616 A1    7/2009    Ichikawa et al.

FOREIGN PATENT DOCUMENTS

JP    H08148190 A    6/1996
JP    2008309651 A    12/2008
(Continued)

*Primary Examiner* — Sarah A Slifka
(74) *Attorney, Agent, or Firm* — Harness, Dickey & Pierce, P.L.C.

(57) ABSTRACT

A method includes estimating, for a given battery cell of a plurality of battery cells, an internal resistance, estimating, for the given battery cell, an open-circuit voltage, determining a target output voltage for the given battery cell, determining a target discharge current for the given battery cell, determining a target internal resistance for the given battery cell based on the estimated open-circuit voltage for the given battery cell, the target output voltage for the given battery cell, and the target discharge current for the given battery cell, determining a target cell temperature for the given battery cell based on the target internal resistance for the given battery cell, and controlling a flow of coolant adjacent to the given battery cell based on the target temperature for the given battery cell.

21 Claims, 14 Drawing Sheets

(51) Int. Cl.
  *H01M 10/615* (2014.01)
  *H01M 10/633* (2014.01)
  *H01M 10/48* (2006.01)
  *H01M 10/6551* (2014.01)
  *B60L 1/02* (2006.01)
  *B60L 3/00* (2006.01)
  *B60L 3/12* (2006.01)
  *B60L 11/18* (2006.01)

(52) U.S. Cl.
  CPC ...... *B60L 2260/44* (2013.01); *H01M 2220/20* (2013.01); *Y02T 10/7005* (2013.01); *Y02T 10/7044* (2013.01); *Y02T 10/7061* (2013.01); *Y02T 10/7291* (2013.01); *Y02T 90/16* (2013.01)

(56) References Cited

FOREIGN PATENT DOCUMENTS

| | | |
|---|---|---|
| JP | 2011014395 A | 1/2011 |
| KR | 20070076833 A | 7/2007 |

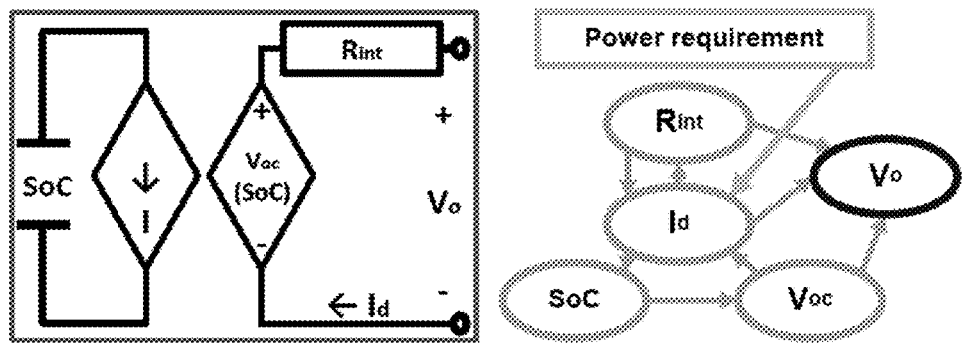
FIG. 3
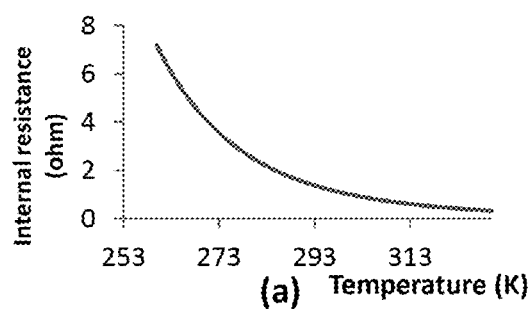
FIG. 4A
FIG. 4B
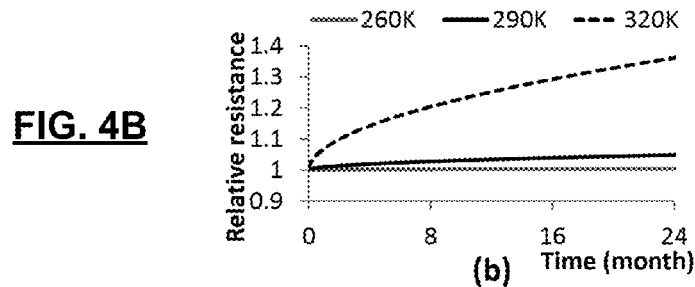 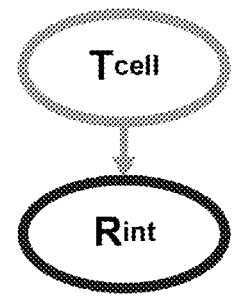

REAL-TIME BATTERY THERMAL MANAGEMENT FOR ELECTRIC VEHICLES

CROSS-REFERENCE TO RELATED APPLICATIONS

This application claims the benefit of U.S. Provisional Application No. 61/973,641, filed on Apr. 1, 2014. The entire disclosure of the application referenced above is incorporated herein by reference.

GOVERNMENT CLAUSE

This invention was made with government support under CNS1138200 awarded by the National Science Foundation. The Government has certain rights in the invention.

FIELD

The present disclosure relates to real-time battery thermal management for electric vehicles.

BACKGROUND

While electric vehicles (EVs) become popular for their environmental friendliness and low fuel cost, they have not fully replaced internal combustion engine vehicles due to the risk of explosion of battery cells, the high price for the large number of battery cells required, and the limited availability of charging stations. As many researchers have pointed out, temperature is one of the most critical factors in designing and operating EVs. For example, an extremely high temperature may lead to explosion or performance degradation of battery cells. In contrast, a battery system operating at a very low temperature might be dysfunctional or have a low capacity due to low reaction rates with freezing electrolytes. In addition, the discharge rate of battery cells varies with temperature, which, in turn, varies their capacity.

To address the challenges related to temperature, most automotive manufacturers have developed their own thermal management systems for their EVs. That is, a Battery Management System (BMS) monitors the temperature of battery cells, and triggers a thermal control function when temperature deviates from a normal operational range. The thermal control includes both cooling control and heating control. Existing controls are all or nothing type controls. That is, existing controls either heat or cool all the battery cells connected in parallel regardless of each individual cell's heating and/or cooling requirement. However, such coarse-grained controls result in a large safety margin and hence inefficiency. More importantly, they do not exploit temperature for more efficient management, in that more sophisticated controls of temperature even within the normal operational range may yield better battery performance.

The goal of this disclosure is to develop thermal management for an efficient and reliable BMS. Efficiency is measured by the ratio of the useful energy delivered by a dynamic system to the energy supplied to it; this may achieve efficiency by maximizing operation-time, or the cumulative time for a BMS to provide the required power after a full battery cell charge. The BMS achieves reliability by providing a required power throughout a given battery warranty period without an explosion or malfunction, while letting its cells undergo charge-and-discharge cycles.

To improve efficiency without compromising reliability, a cyber-physical perspective of battery thermal management system that integrates and coordinates between cyber and physical battery parts is desirable. For physical parts, the battery thermal management system determines thermophysical characteristics of battery cells and external thermal stress conditions, as they have significant impact on battery performance. By carefully accounting for these nonlinear physical properties and abstracting the characteristics in the cyber space as shown in FIG. 1a, a desirable thermal management is developed that reduces the safety margin, thereby increasing the efficiency of the entire battery system in EVs.

To achieve this goal, temperature is used as a control knob; beyond a simple temperature control only for the normal operational range, the battery thermal management system actively controls temperature for more efficient and reliable operations. This requires understanding the thermal and general issues of batteries that affect the efficiency and reliability. Therefore, issues based on a battery's thermophysical characteristics and their impact on the electrical state of battery cells are analyzed and based on this analysis, a strategy is derived to achieving a battery thermal management system with cell-level thermal controls. The battery thermal management system boosts the performance of cells temporarily when high-power is required, while resting cells when low power is required to reduce stresses. To evaluate the proposed BMS, realistic workloads based on real driving patterns are adopted and simulated with a widely-used battery simulator. The simulation results demonstrate the effectiveness of the proposed battery thermal management, improving operation-time up to 58.4%, without sacrificing reliability, over the existing BMS.

This section provides background information related to the present disclosure which is not necessarily prior art.

SUMMARY

A real-time thermal management method for a plurality of battery cells in an electric vehicle, includes estimating, for a given battery cell of the plurality of battery cells, an internal resistance based on a measured output voltage of the given battery cell and a measured discharge current of the given battery cell. The method further includes estimating, for the given battery cell, an open-circuit voltage based on the estimated internal resistance for the given battery cell.

The method also includes determining a target output voltage for the given battery cell based on a vehicle power requirement associated with the electric vehicle and determining a target discharge current for the given battery cell as a function of an estimated state of charge for the given battery cell, a total measured discharge current for the plurality of battery cells, and a total estimated state of charge for the plurality of battery cells.

The method further includes determining a target internal resistance for the given battery cell based on the estimated open-circuit voltage for the given battery cell, the target output voltage for the given battery cell, and the target discharge current for the given battery cell, determining a target cell temperature for the given battery cell based on the target internal resistance for the given battery cell, and controlling a flow of coolant adjacent to the given battery cell based on the target temperature for the given battery cell.

In other implementations, a real-time thermal management system for a plurality of battery cells in an electric vehicle includes a coolant controller that directs coolant adjacent to each of the plurality of battery cells, an estimation module that estimates, for a given battery cell of the plurality of battery cells, an internal resistance based on a measured output voltage of the given battery cell and an measured discharge current of the given battery cell. The estimation module also estimates, for the given battery cell, an open-circuit voltage based on the estimated internal resistance for the given battery cell.

The system also includes a power control module that determines a target output voltage for the given battery cell based on a vehicle power requirement associated with the electric vehicle, determines a target discharge current for the given battery cell as a function of an estimated state of charge for the given battery cell, a total measured discharge current for the plurality of battery cells, and a total estimated state of charge for the plurality of battery cells, and determines a target internal resistance for the given battery cell based on the estimated open-circuit voltage for the given battery cell, the target output voltage for the given battery cell, and the target discharge current for the given battery cell.

The system further includes a cell temperature control module that determines a target cell temperature for the given battery cell based on the target internal resistance for the given battery cell and selectively instructs the coolant controller to direct a flow of coolant adjacent to the given battery cell based on the target temperature for the given battery cell.

In yet other implementations, a real-time management method for a plurality of battery cells in an electric vehicle includes receiving, via a plurality of cell sensors, a measured output voltage for a given battery cell of the plurality of battery cells, receiving, via the plurality of cell sensors, a measured discharge current for the given battery cell, and receiving, via the plurality of cell sensors, a measured cell temperature for the given battery cell.

The method further includes, estimating, based on the measured output voltage and the measured discharge current, a state of charge for the given battery cell, estimating, based on the measured output voltage and the measured discharge current, an internal resistance for the given battery cell, estimating an open-circuit voltage for the given battery cell based on the measured output voltage, the measured discharge current, and the estimated internal resistance, and receiving a vehicle power requirement for the electric vehicle.

The method also includes, determining a target output voltage for the given battery cell based on the vehicle power requirement, determining a target discharge current for the given battery cell as a function of the estimated state of charge for the given battery cell, a total measured discharge current for the plurality of battery cells, and a total state of charge for the plurality of battery cells, and determining a target internal resistance for the given battery cell based on the estimated open-circuit voltage for the given battery cell, the target output voltage for the given battery cell, and target discharge current for the given battery cell.

The method further includes, determining a target cell temperature for the given battery cell based on the target internal resistance for the given battery cell, comparing, for the given battery cell, the target cell temperature and the measured cell temperature, and controlling a flow of coolant adjacent to the given battery cell in response to the comparison between the target cell temperature and the measured cell temperature.

DRAWINGS

The drawings described herein are for illustrative purposes only of selected embodiments and not all possible implementations, and are not intended to limit the scope of the present disclosure.

FIG. 3 are diagrams of a circuit-based battery model;

FIGS. 4A-4B are graphs illustrating internal resistance increases as temperature decreases and relative internal resistance increases as time to expose to high temperature increases, respectively;

Corresponding reference numerals indicate corresponding parts throughout the several views of the drawings.

DETAILED DESCRIPTION

Example embodiments will now be described more fully with reference to the accompanying drawings.

Figure 1A:
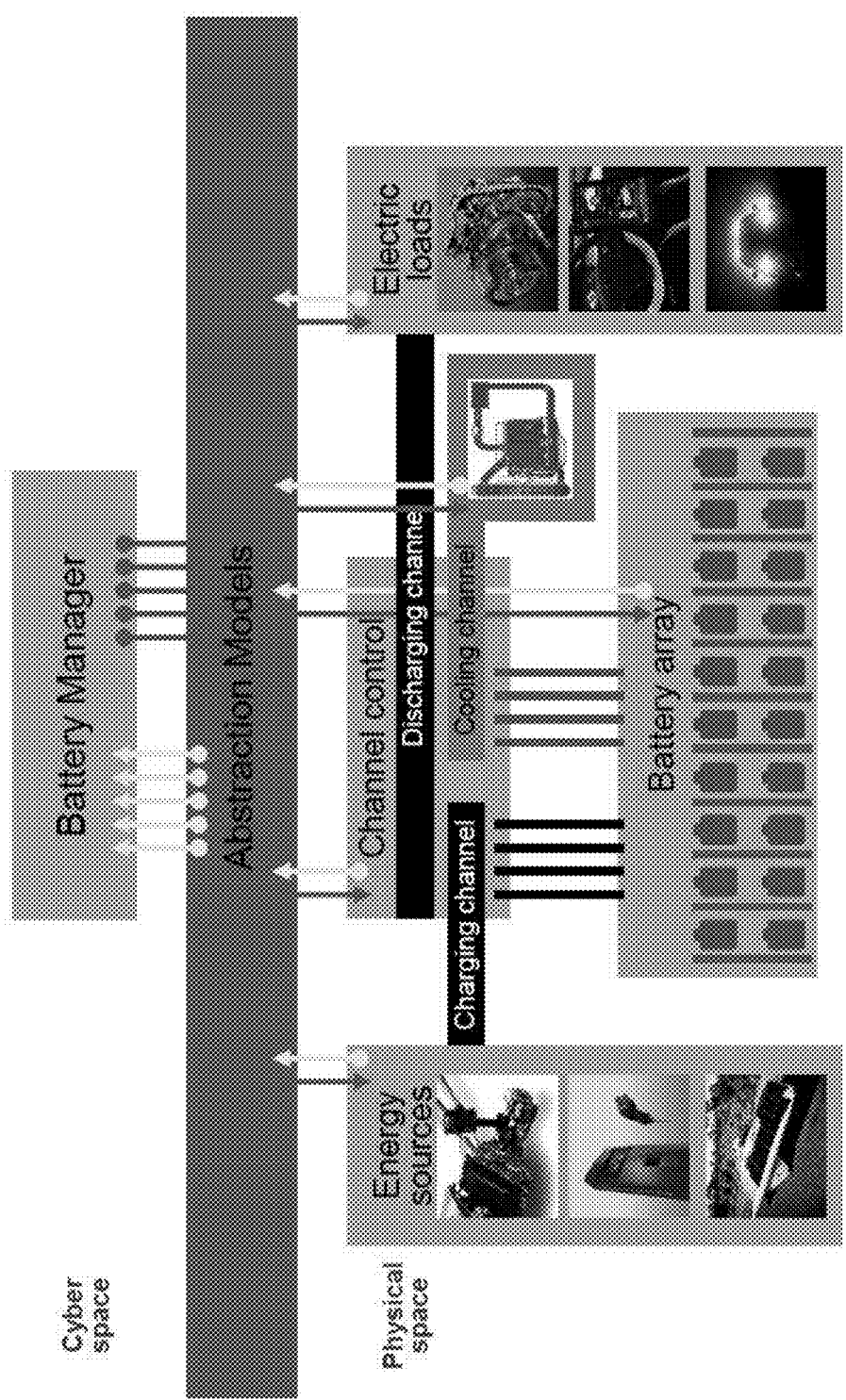
FIG. 1a is a cyber-physical perspective diagram for a battery management system.
Figure 1B:
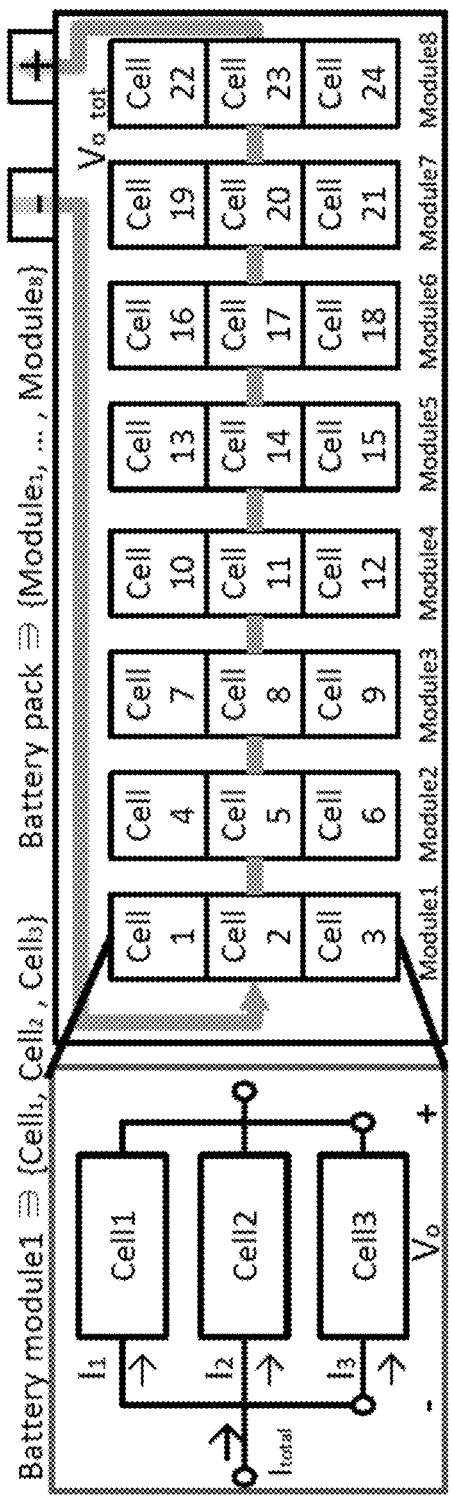
FIG. 1b is a diagram of an example battery pack with modules and cells.

A battery management system (BMS) accommodates a battery pack with several batteries. As illustrated in FIG. 1b, a battery pack consists of some interfaces (e.g., electrodes) and several battery modules, each of which include several battery cells. In a battery module, all the battery cells are connected in parallel, which reduces the possibility of battery failure caused by a cell-level failure. The battery modules in a battery pack are usually connected in series, enabling the battery pack to provide a high voltage and power.

The BMS is responsible for powering EVs while protecting hundreds or thousands of battery cells from damage and keeping them in an operational condition. For a BMS to perform such functions, battery cells should be properly controlled because their safety and performance depend on stress conditions around them.

Rate-capacity effect and recovery effects are the most prominent physical properties for efficient battery management. Rate-capacity effect means that the higher the discharge rate, the lower the deliverable capacity. For example, while the operation-time of a battery cell at the discharge rate of 1 C-rate is 60 minutes, that at 2 C-rate is strictly less than 30 minutes. Recovery effect means that a rest restores the output voltage temporarily dropped by large discharge current. Therefore, the BMS increases the capacity of batteries, by minimizing discharge rate per cell and utilizing batteries with a rest.

State-of-Charge (SoC) represents percentage of deliverable charge, from 0% with no charge, to 100% with full, and balancing SoC is one of the most critical issues affecting the performance of large-scale battery systems because the performance of a large battery pack depends on the electrical state of the most worn battery cell in the pack. For example, after one cell dies, discharge rates of the remaining cells in a parallel-connected system would become higher, making them discharge inefficiently. Therefore the SoC of battery cells should be balanced.

To achieve better battery performance, a line of work has focused on battery scheduling that equalizes SoC and/or reduces the discharge rate. They control switches to draw energy from battery cells at a proper discharge rate. For example, when an electric motor needs high power, a battery manager connects all the cells to the electric load to improve battery efficiency. In contrast, when the motor demands low power from the battery, the battery manager disconnects some cells with low SoC, achieving recovery of the output voltage and equalization of SoC.

Besides discharge behaviors and SoC balancing, battery thermal characteristics are also important to their efficiency, operation, and safety. Of the plurality of potential battery characteristics, focusing on two specific characteristics may result in more efficient battery operation.

First, battery efficiency improves temporarily at "instant high temperature" due to the increased chemical reaction rate and ion mobility. However, the "cumulative exposure to high temperature" causes permanent lifetime to decline because of its acceleration of irreversible side reaction. Therefore, most BMSes are required to restrict each cell within a certain temperature range to achieve reasonable performance. Thus, every EV must be equipped with a thermal management system that keeps cell temperature within the operational range, requiring both cooling and heating. Whenever the temperature of a battery pack deviates from an operational temperature range, thermal management is activated to guarantee thermal stability of batteries.

For cooling, the radiator transfers heat from the fluid inside to the air outside, thereby cooling the fluid, which in turn cools battery cells. Heating is also required for operation at extremely cold temperature. For example, a first vehicle (such as a General Motors Chevy Volt) may use 144 thermal fins to actively cool and/or heat 288 battery cells with a coolant flow valve controlling cooled and/or heated coolant flows. A second vehicle (such as a Ford Focus) may also be equipped with an active liquid cooling and heating system for thermal management of its lithium-ion battery packs.

This simple approach has been effective for the normal operation of battery cells during a vehicle warranty period. A battery can be manufactured to last the duration of a warranty by thoroughly testing battery cell performance in thermal experiment chambers.

However, such a passive, coarse-grained thermal control does not take full advantage of thermal management systems. By understanding battery thermal characteristics and controlling temperature, improvements can be made to a battery's capacity without compromising the lifetime of battery cells. This is because, heating the cell increases battery cell performance instantaneously, while cooling the cell for the when low power is required can delay lifetime capacity drop of the cell. The principles of the present disclosure illustrate a battery thermal management system that regulates cell temperature systematically, by controlling battery dynamics and cell-level thermal management for more efficient and reliable battery control.

A battery pack in EVs supplies direct-current (DC) power to an inverter which operates electric motors in an EV. To operate the electric motors, a power inverter requires an applicable input voltage ($V_{app}$) during the vehicle's operation. Then, the operation-time ($l_{op}$) is defined as the cumulative time for a battery pack to provide the required power with applicable output voltage range after a full charge.

Therefore, a BMS should enable its battery pack to supply the required power ($P_{req}(t)$) to the electric motors while maintaining output voltage no less than the applicable input voltage for a long operation-time. Meanwhile, the operation-time should be kept long during the battery warranty period; otherwise, the vehicle requires a larger battery pack and/or batteries must be recharged more frequently.

The battery thermal management system of the present disclosure yields a long operation-time during the warranty period by controlling temperature by selecting the coolant type in each of a plurality of thermal fins at each time instant to be cooled or heated, which will be described in detail below. That is, the coolant type is used as a control knob for the battery thermal management system. The battery management system then determines the coolant type at each time instant ($C_{fin}(t)$) such that the operation-time ($l_{op}$) is maximized during the warranty period without any malfunction or explosion, which is formally expressed as Given stress conditions $\{P_{req}(t), T_{ext}(t)\} 0 < t < t_{warr}$, determine $\{C_{fin}(t)\} 0 < t < t_{warr}$ such that $l_{op}$ is maximized at $t_{warr}$ without any malfunction or explosion in $[0, t_{warr}]$, where $T_{ext}(t)$ is temperature outside the battery pack, and 0 and $t_{warr}$ are the time at the beginning and end of the battery warranty period, respectively. Note that the stress conditions and the control of $C_{fin}(t)$ are valid and/or necessary only during the operation of the EV in $[0, t_{warr}]$. Also note that $l_{op}$ monotonically decreases over time. This is due to the performance of a battery keeps on degrading over time and never recovering. Therefore, $l_{op}$ at any time during the warranty period is at least as much as that at $t_{warr}$.

Several battery dynamics under stress conditions affect the performance and safety of battery systems. For example, uncontrolled high temperature may cause an explosion, while an extremely low temperature reduces the battery's performance, potentially leading a failure to power the electric vehicle. Therefore, the impacts and dependencies of control knobs and external conditions on battery dynamics should be analyzed to improve the safety and performance of a battery system.

To this end, the present disclosure first identifies the factors that affect the performance by bridging different abstraction models for battery physical dynamics. Then, based on the unified abstraction model, the present disclose addresses how a change in temperature affects battery physical dynamics, which will be a basis for the battery thermal management system, described with respect to FIG. 2. By analyzing the dependency on thermal conditions and the impacts on states of batteries, the present disclosure illustrates how controllable thermal conditions affect the output voltage of the entire battery system and each cell's temperature.

Figure 2:
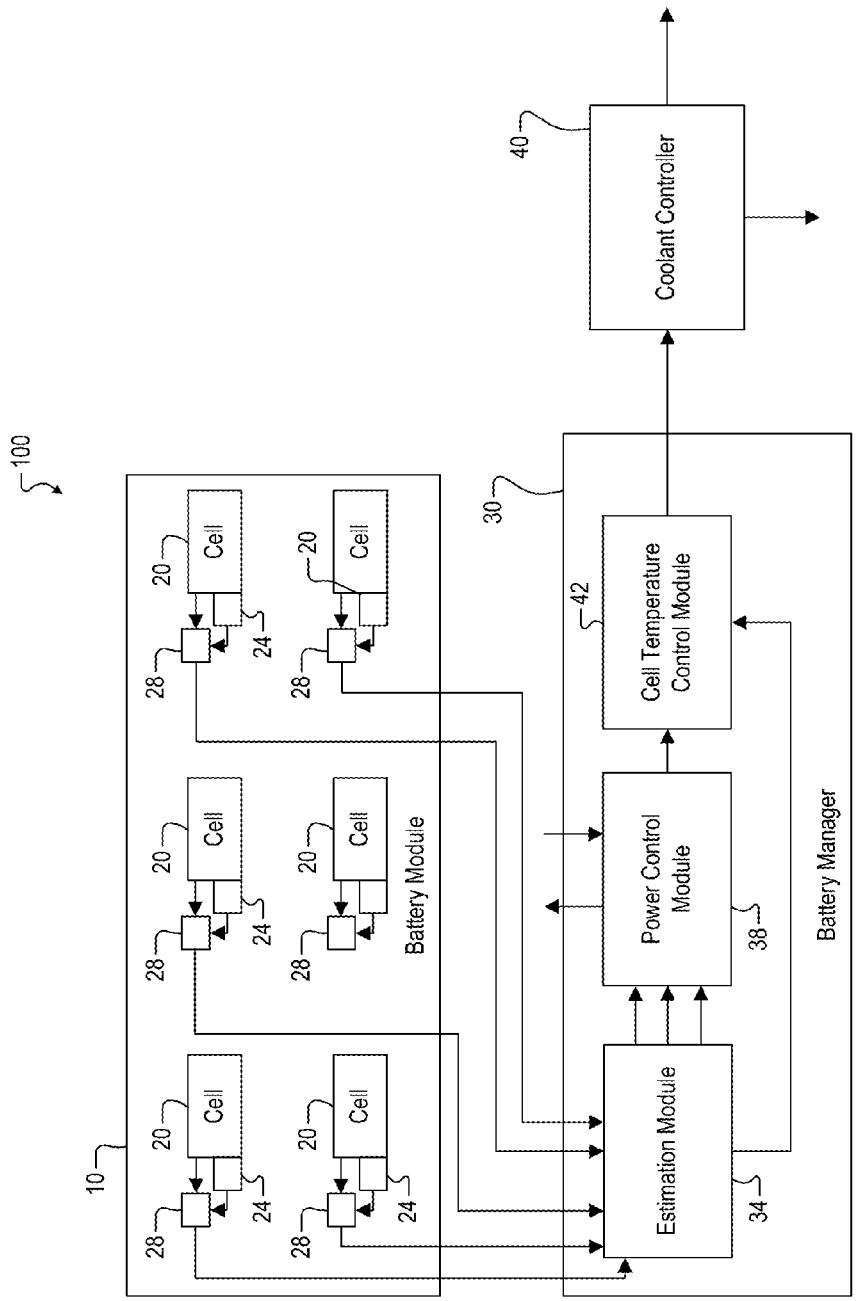
FIG. 2 is a functional block diagram of a battery thermal management system according to the principles of the present disclosure.

With reference to FIG. 2, a battery thermal management system (BTMS) is illustrated generally at 100. The BTMS 100 includes a battery module 10, a battery manager 30, and a controller 40. The battery module includes a plurality of battery cells 20. As described above, each of the battery cells 20 includes a thermal fin 24. Further, each of the battery cells 24 includes at least one battery cell sensor 28. The sensors 28 are configured to measure various characteristics of the cells 20 and the thermal fins 24.

For example, a first cell 20 includes a first thermal fin 24. A first sensor 28 is in communication with the first cell 20 and the first thermal fin 28. The first sensor 28 measures various characteristics of the first cell 20. For example only, the first sensor 28 may measure an output voltage, a discharge current, and a present cell temperature of the first cell 20.

The first sensor 28 may measure various characteristics of the first thermal fin 24. For example, the first sensor 28 may measure a present temperature of the first thermal fin 24. In some implementations, the present temperature of the first thermal fin 24 may be indicative of a present temperature of the first cell 20. As will be described in detail below, the BTMS 100 may selectively direct heated or cooled coolant to the first thermal fin 24, based on a present temperature of the first thermal fin 24, in order to control a temperature of the first cell 20. It is understood that while only limited examples of sensor measurements are described, the sensors 28 may measure any suitable characteristics of the cells 20 and the thermal fins 24.

Each of the sensors 28 are in communication with the battery manager 30. For example, the sensors 28 are configured to communicate measured characteristics associated with the cells 20 and the thermal fins 24 to the battery manager 30. The battery manager 30 includes an estimate module 34, a power control module 38, and a cell temperature control module 42.

The estimation module 34 receives each of the measured characteristics from the sensors 28. The estimation module 34 may estimate various characteristic values associated with the cells 20 and the thermal fins 24 based on the received measured characteristics. For example, the estimation module 34 receives a measured output voltage, a measured discharge current, and a present temperature associated with the first cell 20. While only the first cell 20 is described, it is understood the estimation module 34 estimates characteristic values associated with each of the plurality of cells 20.

As will be described in greater detail below, the estimation module 34 estimates a state of charge, an internal resistance, and an open-circuit voltage based on the measured output voltage, discharge current, and present temperature of the first cell 20. The estimation module 34 may communicate the received measured values and the estimated values to the power control module 38 and the cell temperature control module 42.

The power control module 38 is configured to determine a target output voltage for each of the plurality of cells 20 based on a power requirement. As will be described in greater detail below, the power control module 38 receives a vehicle power requirement indicative of a required power of an EV associated with the plurality of battery cells. For example, an EV may increase required power as the EV accelerates. Conversely, the EV may reduce the required power as the EV decelerates.

In one implementation, the power control module 38 is configured to determine whether the received vehicle power requirement is greater than a high power threshold as described in detail with reference to FIGS. 6a-6b.

The power control module 38 compares the received vehicle power requirement to high power threshold. When the power control module 38 determines the received power requirement is greater than the high power threshold, the power control module 38 sets the target output voltage for the first battery cell to a first output voltage value.

Conversely, when the power control module 38 determines the received power requirement is less than the high power threshold, the power control module 38 sets the target output voltage for the first battery cell to a second output voltage value. While only the first cell 20 is described, it is understood the power control module 38 is configured to control output voltages associated with each of the plurality of cells 20.

In some implementations, the power control module 38 is configured to determine a target discharge current ($I_d$) and a target internal resistance ($R_{int}$) for each of the plurality of cells 20. For example, the power control module 38 is configured to determine a total discharge current for the battery module 10 based on the current discharge limit. The power control module 38 then determines a target ($I_d$) for each of the cells 20.

The power control module 38 sets each of the cells 20 discharge rate no larger than ($I_{dlim}$) for reduction of inefficient energy dissipation. Suppose $$\left( I_{dlim} \leq \frac{P_{req}}{N \cdot V_{tot}} \right)$$

holds, where ($P_{req}$) is the required power, N is the number of parallel-connected cells, and ($V_{tot}$) is the total output voltage. Then, by making each cell discharged at $$\frac{I_{tot}}{N},$$

the power control module 38 can supply the required power without excessive heat dissipation, where ($I_{tot}$) is total discharge current. The power control module 38 sets ($I_d$) based on the SoC when the level of power requirement ($P_{req}$) is satisfied; cells 20 with higher SoC should work more. Therefore, the power control module 38 sets the discharge current $$(I_d) \text{ to } \frac{I_{tot}}{N} \text{ if } I_{dlim} \leq \frac{P_{req}}{N \cdot V_{tot}}$$

holds, and $$I_{tot} \frac{SoC}{\Sigma Soc}$$

otherwise, which is recorded as $$I_d = \begin{cases} \frac{I_{tot}}{N}, & \text{if } I_{dlim} \leq \frac{P_{req}}{N \cdot V_{tot}} \\ I_{tot} \frac{SoC}{\Sigma Soc}, & \text{otherwise} \end{cases}.$$

For example, and described in greater detail below, the power control module 38 sets the target ($I_d$) equal to the total discharge current divided by the total number of cells 20.

The power control module 38 then determines the target ($R_{int}$) for each of the cells 20. For example, and described in detail below, the power control module 38 sets the ($R_{int}$) equal to the result of the estimated open-circuit voltage minus the target output voltage divided by the target ($I_d$) for each of the cells 20. The power control module 38 communicates the target ($I_d$) and the target ($R_{int}$) for each of the cells 20 to the cell temperature control module 42.

The cell temperature control module 42 is configured to control cell temperature of each of the cells 20. In one implementation, the cell temperature control module 42 receives the target ($R_{int}$). As described in detail below, the cell temperature control module 42 determines a target cell temperature for each of the cells 20 based on the target ($R_{int}$). The target cell temperature for each of the cells 20 may be a temperature at which the cells 20 operate efficiently in order to deliver the required power.

As described in detail below, the cell temperature control module 42 then determines a target ambient temperature for the battery module 10. It is understood that the ambient temperature within the battery module affects the temperatures of the cells 20. The cell temperature control module 42 then determines a target temperature for each of the plurality of thermal fins 24 based on the target ambient temperature.

The cell temperature control module 42 then determines whether each of the thermal fins 24 should be heated or cooled based on a comparison between a measured temperature of each of the thermal fins 24 and the target temperature for each of the thermal fins 24. For example, the cell temperature control module 42 compares a first target temperature for the first thermal fin 24 with a received measured present temperature of the first thermal fin 24. When the cell temperature control module 42 determines the target temperature for the thermal fin 24 is greater than the present temperature of the thermal fin 24, the cell temperature control module 42 determines the first thermal fin 24 should be heated in order to reach the target temperature for the first thermal fin 24.

Conversely, when the cell temperature control module 42 determines the target temperature for the first thermal fin 24 is less than the present temperature of the first thermal fin 24, the cell temperature control module 42 determines the first thermal fin 24 should be cooled in order to reach the target temperature for the first thermal fin 24.

In some implementations, the cell temperature control module 42 communicates with the coolant controller 40. The coolant control 40 is configured to control a plurality of coolant flow control valves (not shown) in order to direct coolant flow throughout an EV. For example, the coolant control 40 may open or close particular valves in order to direct cool coolant to an area within the EV that is above a temperature threshold in order to cool the area.

The cell temperature control module 42 selectively instructs the coolant controller 40 to direct heated and/or cool coolant to each of the cells 20. For example only, as described above, the cell temperature control module 42 determines whether the present temperature of the first thermal fin 24 is greater than or less than the target temperature for the first thermal fin 24. In the example where the cell temperature control module 42 determines the present temperature of the first thermal fin 24 is less than the target temperature for the first thermal fin 24, the cell temperature control module 42 instructs the coolant controller to direct heated coolant to the first thermal fin 24.

In this manner, the cell temperature control module 42 controls the thermal characteristics of the first thermal fin 24. As described above, the temperature of the first thermal fin 24 may be indicative of the temperature of the first cell 20. Given that understanding, the battery manager 30 may control the thermal characteristics of the first cell 20 via the first thermal fin 24 in order to respond to the required power. It is understood that while only the first cell 20 is described, the above applies to all of the cells 20.

By analyzing the dependency n thermal conditions and the impacts on states of batteries, one can determine how thermal conditions affect the output voltage of the entire battery system and each cell's temperature. Output voltage ($V_o$) dictates the operation-time of a battery system, and the output voltage is greatly affected by battery cells' internal states. A circuit-based battery model, such as the battery module 10, uses fundamental electric elements, such as internal resistance ($R_{int}$), discharge current ($I_d$), and open-circuit voltage ($V_{oc}$) to represent the cell's internal states, and explains the output voltage by basic circuit theory as described in FIG. 3 and Eq. (1). When the cell is connected to an external load, an electron flow ($I_d$) occurs from the anode to the cathode through the external load. Open-circuit voltage ($V_{oc}$) is the difference of electrical potential between two terminals of the cell when disconnected from any circuit, and it largely depends on deliverable charges (SoC) in battery cells. The internal resistance ($R_{int}$) represents all the factors causing voltage drop between open-circuit voltage ($V_{oc}$) and output voltage ($V_o$) when the power source delivers current. In addition, large capacitors are adopted to represent states of deliverable charge (SoC) of cells. Then, the output voltage is expressed as:

$$V_o = V_{oc} - I_d R_{int} = f(SoC) - I_d R_{int} \qquad (1)$$

which says that a change in internal resistance affects output voltage as follows:

P1. Internal resistance ⇒ Output voltage (R↑→$V_o$↓): As the internal resistance gets higher, the output voltage decreases.

Supplying the required power ($P_{req}$) to the electric load induces power dissipation ($P_d$) in a battery pack. That is, total power consumption ($P_{bat}$) in a battery pack ($P_{bat}$) consists of the two power consumption parameters ($P_{req}$ and $P_d$) as shown in the following equation:

$$V_{oc} = V_o + I_d R_{int} \Rightarrow V_{oc} I_d = V_o I_d + I_d^2 R_{int} \qquad (2)$$
$$\Rightarrow P_{bat} = P_{req} + P_d.$$

Therefore, to use batteries efficiently and increase the operation-time of a battery pack, a BMS should reduce power dissipation ($P_d$) during operation, which is recorded as follows.

P2. Internal resistance ⇒ Power dissipation ($R\uparrow \rightarrow P_d \uparrow$): As internal resistance gets higher, power dissipation increases.

Since the output voltages of the cells connected in parallel should be the same and the variation of open-circuit voltage is small, discharge current depends on internal resistance according to Eq. (1). Then, the discharge current of a cell with larger internal resistance is lower than that of the other cells in the module, as recorded in the following statement:

P3. Internal resistance ⇒ Discharge rate ($R\uparrow \rightarrow I_d \downarrow$): As internal resistance gets higher, the discharge rate per cell decreases in a module.

As shown in P1 and P2, internal resistance is an important parameter that affects battery performance. Therefore, internal resistance varies with thermal stresses during operation.

An operation cycle represents a cycle of a battery cell's, such as one of the battery cells 20, operation from its full charge to no charge. A calendar life is a duration from a battery cell's 20 production to its warranty period (e.g., 5 years). Temperature affects internal resistance, when a given temperature that lasts during (i) an operation cycle, and (ii) a calendar life.

Regarding (i), a higher temperature stimulates the mobility of electron or ion, temporarily reducing the cell's 20 internal resistance and increasing its capacity (by P2). For example, as shown in FIG. 4(a), resistance with 320K is smaller than that with 290K. Therefore, during an operation cycle, the following relation holds:

P4. Temperature ⇒ Internal resistance ($T\uparrow \rightarrow R\downarrow$ (operation cycle)): As temperature during an operation cycle increases, internal resistance decreases.

In literature, relation between internal resistance and cell temperature is well-described by a polynomial model, and experimental results substantiate its effectiveness:

$$R_{int}=c_3 T_{cell}^3+c_2 T_{cell}^2+c_1 T_{cell}+c_0. \quad (3)$$

This model dictates cell temperature ($T_{cell}$), for the cells 20, for the required internal resistance ($R_{int}$).

On the other hand, a long-term temperature exposure affects internal resistance the other way around, as explained next. Performance of the battery module 10 deteriorates over time, regardless of whether the battery module 10 is used or not, which is known as "calendar fade", and it can be represented by a rise of internal resistance as shown in FIG. 4(b). There are two key factors influencing the calendar life, namely temperature (T) and time (t), and empirical evidences show that these effects can be represented by two relatively simple mathematical dependencies (t and T). The extent of deterioration can be assessed by relative resistance ($\mu$), which is expressed as:

$$\mu(T;t) = 1 + \exp\left(\beta_0 + \beta_1 \cdot \frac{1}{T}\right) \cdot t^\rho, \quad (4)$$

where $\beta_0$, $\beta_1$, and $\rho$ represent the model parameters. According to Eq. (4), the following statement holds:

P5. Temperature over time=Resistance ($t\uparrow, T\uparrow \rightarrow R\uparrow$ (calendar life)): As time to high temperature exposure increases during a calendar life, internal resistance increases.

While internal resistance depends on cell temperature (P4 and P5), cell temperature, in turn, varies with internal states and external stresses of the battery module 10.

Any battery operation generates heat due to resistance of electrodes ($R_e$) when one of the cells 20 delivers power to electric loads, which is also known as joule heating ($I_d^2 R_{int}$ loss). Some part of generated heat ($Q_d$) would be released on the surface of cells 20 ($Q_t$), and the remaining heat is absorbed into cells 20 materials ($Q_s$), which can be calculated by:

$$Q_d = I_d^2 R_{int}, \quad Q_s = C_{cell}\frac{dT\text{ cell}}{dt},$$
$$Q_t = Ah(T_{cell} - T_{amb}),$$

where A is the surface area, h the heat transfer coefficient, $T_{amb}$ temperature around the cell 20, and $C_{cell}$ heat capacity, respectively. Note that ambient temperature ($T_{amb}$) is affected by external temperature ($T_{ext}$) and temperature of thermal fins 24 ($T_{fin}$).

Eq. (5) shows Bernardi's energy balance, and it can explain cell temperature ($T_{cell}$) variation by heat generation ($Q_d$) as shown in FIG. 5. Then, Eq. (5) can be solved by Eq. (6) as follows.

$$Q_d = Q_t + Q_s \quad (5)$$

$$T_{cell}(t+\Delta)=T_{cell}(t)+\Delta t[(T_{cell}-T_{amb})+c_0 I_d^2 R_{int}]. \quad (6)$$

where t is current time and $\Delta t$ time interval. Based on the equation, the following statement holds.

P6. Discharge current ⇒ Heat generation ($I_d\uparrow \rightarrow T\uparrow$): As discharge current increases, heat generation increases.

Figure 5A:
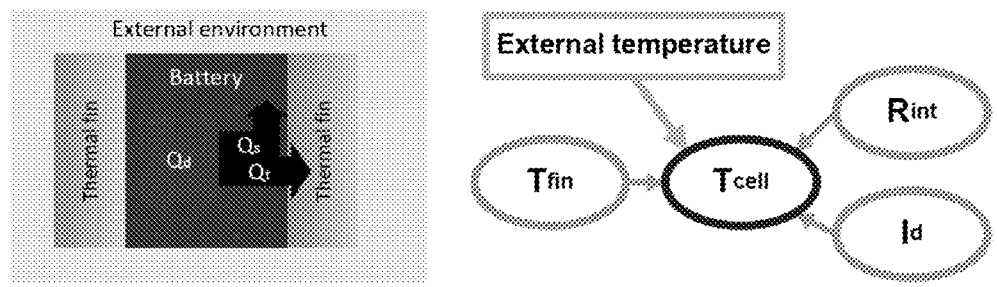
FIG. 5a are diagrams depicting battery thermal dynamics.

Bridging all the battery module 10 characteristics discussed in P1-P6, we have an abstract layer from the temperature of thermal fins 24 ($T_{fin}$) to operation-time, as illustrated in FIG. 5a.

Figure 5B:
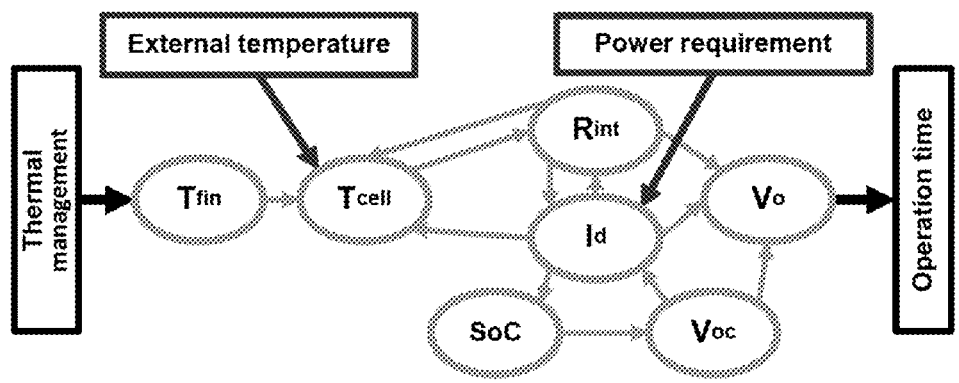
FIG. 5b is diagram depicting an abstraction of battery dynamics.

The BTMS 100 is configured to increase battery module 10 operation-time during its warranty period without explosion and malfunction. To figure out battery dynamics, associated with the battery module 10, affecting the operation-time and safety, the BTMS 100 constructs an abstraction layer by accumulating several physical dependencies as shown in FIG. 5b.

Figure 7:
FIG. 7 is a diagram showing increase in temperature of a cell causes a further increase in the temperature, potentially resulting in explosions of the battery cells because of material decomposition inside the cells.

Thermal runaway is one of the most serious thermal issues affecting safety of a battery cell 20, and results in extremely high temperature and current. A rise in the temperature of a battery cell 20 decreases its internal resistance (by P4) and increases its current (by P3), which, in turn, raises its temperature (by P6); this process may repeat, as illustrated in FIG. 7. Since extremely high temperature (above around 80° C.) may cause an explosion due to decomposition of materials, the thermal stability of battery cells 20 should be maintained.

Figure 8:
FIG. 8 is a diagram showing low temperature leads to high internal resistance and voltage drop.

The BTMS 100 a specification of applicable output voltage ($V_{app}$). The BTMS 100 guarantees delivery of the required power within ($V_{app}$) range. However, a decrease in temperature increases internal resistance (by P4), and it may cause a higher voltage drop (by P1). Output voltage ($V_o$) drops below the applicable voltage ($V_{app}$)) making a power inverter unable to operate in a specified condition, and hence failing to provide the required power to the vehicle's electric motors. FIG. 8 illustrates how a low temperature causes malfunction.

Figure 9:
FIG. 9 is a diagram showing low temperature leads to higher internal resistance and power dissipation.

A decrease in temperature reduces the mobility of charges and chemical reaction in cells, which can be represented by the increased internal resistance (by P4). This increased internal resistance implies a larger power dissipation during operation (by P2), which reduces operation-time as shown in FIG. 9. For example, it is reported that a drop of just 20 Celsius degrees can drain 10-20% of a battery's charge.

Operating under continuous exposure to high temperature induces a rapid increase in internal resistance (by P5) due to the acceleration of irreversible side reactions. The increase in internal resistance causes energy dissipation of cells, shortening their operation-time. Faster performance degradation may also cause the battery module 10 to malfunction even during its warranty period (by P1 and P2), potentially leading to tragic accidents or financial loss as illustrated in FIGS. 8 and 9.

Figure 10:
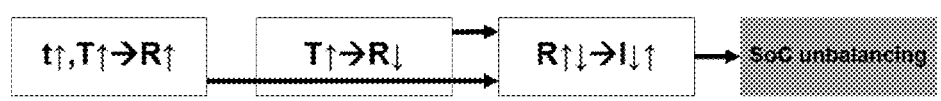
FIG. 10 is a diagram showing uneven degradation and temperature of cells cause different internal resistances of battery cells, leading to different discharge current and SoCes.

Uneven temperature distribution causes different resistances between battery cells 20 in a battery module 10, which may be part of a larger battery pack (by P4 and P5). Since the discharge rate depends on internal resistance (by P3), the discharge rates available for different cells 20 are uneven, leading to unbalanced SoC among the cells 20 in a battery module 10 as shown in FIG. 10.

Figure 11:
FIG. 11 is a diagram showing uneven states of cells yield different rate-capacity/recovery effects, leading to unbalanced electrical states.

A higher discharge rate causes more capacity loss yielding larger voltage drop due to heat loss (by P5), called rate-capacity effect described above. In case of a very low (or zero) discharge rate, the battery module 10 can recover its capacity loss to some extent during high-rate of discharge, called recovery effect, which is described above. Uneven temperature distribution may cause more unexpected discharge current (by P3, P4, P5), leading to more rate-capacity effect in some cells 20 as shown in FIG. 11. Also, uneven discharge rates cause different amounts of heat loss (by P6), causing unbalanced SoC of cells 20 in a battery module 10.

So far, the present disclosure has investigated and abstracted the physical characteristics of batteries and uncovered their effects on thermal dynamics that dictate the performance of a large-scale battery system. Based on these, the present disclosure now describes the thermal requirements considering the thermal dynamics, and then develop a battery thermal management policy which can satisfy the requirements based on the abstraction.

To enhance the operation-time of the battery module 10 the physical dynamics described above must be controlled. To protect battery cells 20 from thermal runaway and malfunction as low temperature, the operation temperature ($T_{cell}$) should lie between its upper ($T_{up}$) and lower ($T_{low}$) bounds as follows R1. $T_{low} < T_{cell} < T_{up}$.

According to P3, delivering power with high temperature reduces internal resistance and improves the capacity of a battery cell during an operation cycle. Unfortunately, continuous/frequent exposure to high temperature also accelerates the degradation of battery cells during a calendar life (as shown in P4). According to these two characteristics, to improve capacity of cells while increasing lifetime, the BTMS 100 should R2'. Maximize [$T_{cell}(t)$] for $0<t<t_{warr} \epsilon$ OPERATION, and R3'. Minimize[$\int_0^{t_{warr}} T_{cell}(t) dt | t \epsilon$ OPERATION], where OPERATION is a set of time intervals in which an EV operates.

However, the BTMS 100 cannot achieve R2' and R3' at the same time, because maximizing cell temperature will increase cumulative cell temperature. Therefore, existing studies on battery thermal management attempted to determine a static operation temperature range, rather than dynamic thermal control, and therefore they cannot fully address the two requirements.

Figure 12:
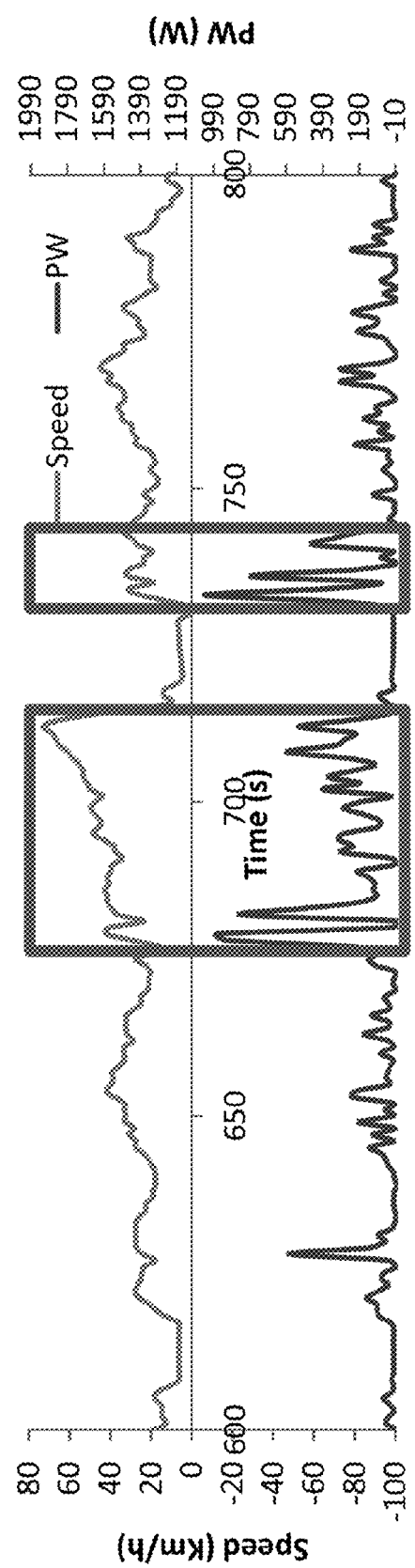
FIG. 12 is a graph showing driving pattern and power requirements, generated by a vehicle simulator with real driving records.

To achieve R2' and R3' together, the BTMS 100 should focus on a property: EVs require power intermittently, rather than continuously. For example, requiring high power for rapid accelerations consumes most energy as shown in FIG. 12. This means, the BTMS 100 does not have to heat cells 20 all the time for reduction of energy dissipation, because heating the cells 20 only during the period of high power requirement can reduce energy dissipation mostly. Therefore, separating the management period based on the power requirement can greatly reduce the energy dissipation without losing potential performance improvement much. That is, the BTMS 100 divides OPERATION into two: WORK and REST, which denote a set of time intervals in OPERATION in which a battery cell 20 should provide a high power, and a lower power (or no power) is required, respectively; by definition, OPERATION=WORK∪REST. By modifying R2' and R3' such that it is possible to achieve them together by scheduling heating and/or cooling based on their working and/or resting status: maximizing working cell 20 temperature ($T_{cell}$, if t∈WORK) and minimizing cumulative resting cells 20 temperature ($T_{cell}\downarrow$, if t∈REST) as recorded below.

R2. Maximize[$T_{cell}(t)$] for $0<t<t_{warr} \epsilon$WORK, and

R3. Minimize[$\int_0^{t_{warr}} T_{cell}(t) dt | t \epsilon$REST],

Also, the BTMS 100 should take into account issues that previous work focused on. First, equalize the SoC of cells 20 during operation-time (as mentioned earlier), because just one deep discharged battery cell 20 can lead to significant reduction of capacity of the entire battery pack. Therefore, the BTMS 100 enforces R4. Minimize deviation [SoCes].

By rate-capacity effect, a higher discharge rate causes inefficiency of the battery module 10. To reduce inefficient energy loss by excessive high discharge rates, the BTMS 100 sets a discharge current limit ($I_{dlim}$) where the rate-capacity effect does not have much impact on the cell's 20 capacity, and enforce cells 20 to operate within the tolerable discharge rate range ($\leq I_{dlim}$), if possible as follows.

R5. $I_d \leq I_{dlim}$ if possible.

Meeting R1-R5 will reduce energy dissipation and protect cells 20 from unbalanced SoC, explosion, and malfunction. By controlling the temperature of each of the cells 20, we can directly meet R1-R3 and also alter discharge rate, addressing R4 and R5. That is, by P3 and P4, the BTMS 100 can decrease (increase) discharge rate by lowering (raising) temperature.

Figure 6A:
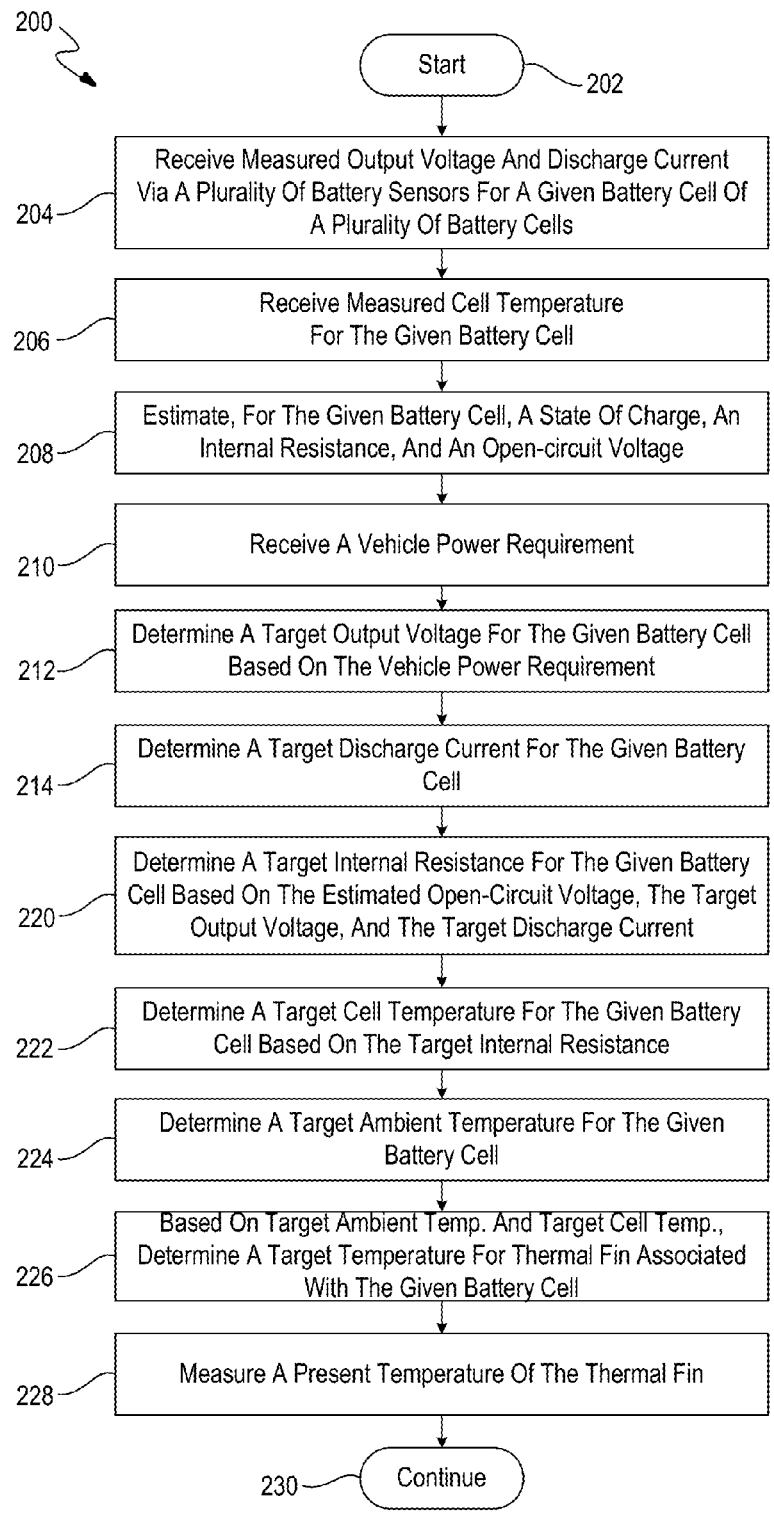
FIG. 6a-6b illustrate a flow diagram illustrating a method for battery thermal management according to the principles of the present disclosure.
Figure 6B:
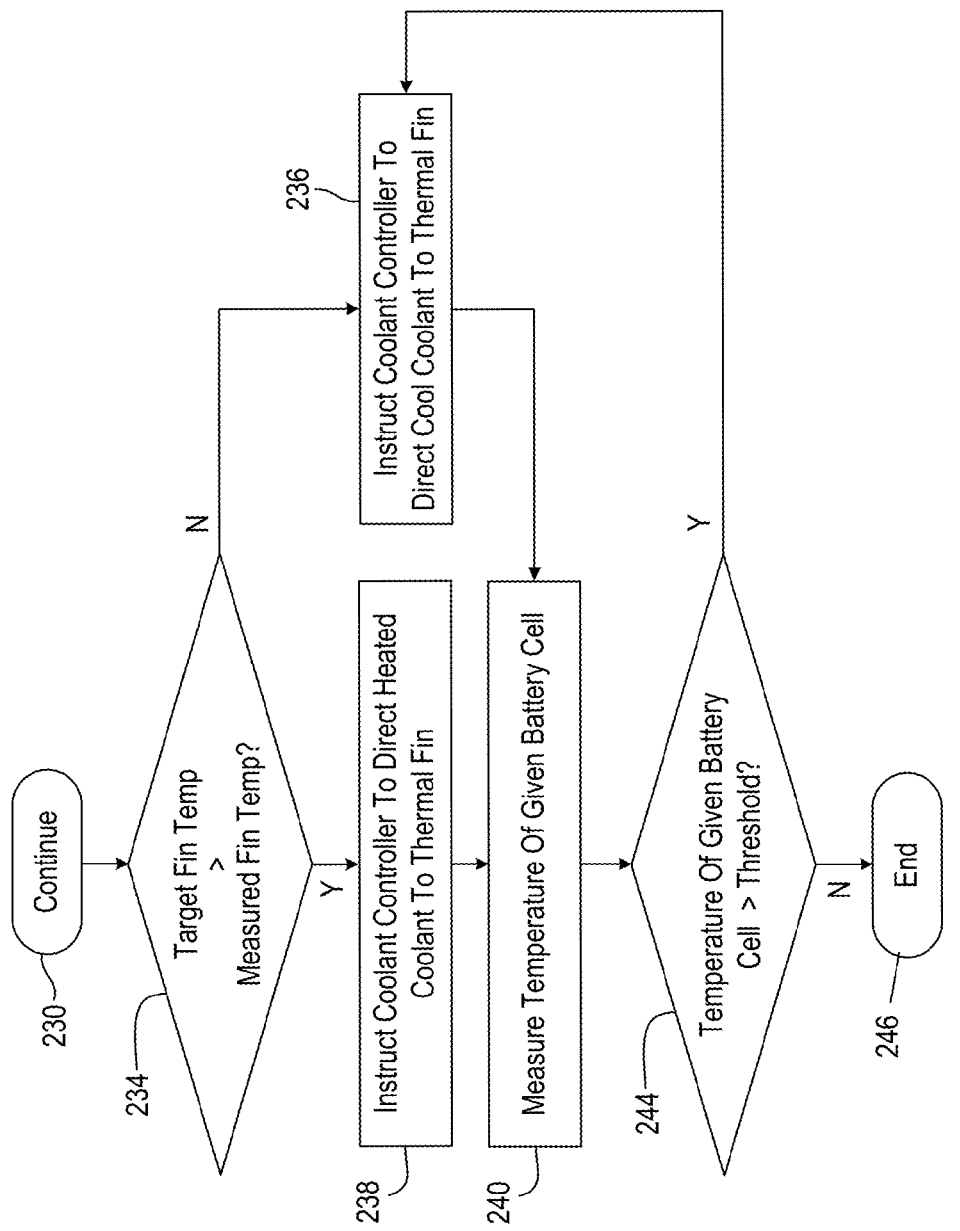

FIGS. 6A and 6B illustrate an exemplary real-time battery thermal management method 200 which may be implemented by BTMS 100. At 204, the method 200 receives a measured output voltage and a measured discharge current for a given battery cell of a plurality of battery cells. For example, as described above, a plurality of cell sensors measure battery cell characteristics of each of the battery cells of the plurality of battery cells. The estimation module 34 receives a plurality of measurements associated with each of the plurality of battery cells via the plurality of cell sensors. For example, the estimation module 34 receives the measured output voltage for the given battery cell and the measured discharge current for the given battery cell.

At 206, the estimation module 34 receives a measured cell temperature for the given battery cell. At 208, the estimation module 34 estimates, for the given battery cell, a state of charge, an internal resistance, and an open-circuit voltage. For example, the estimation module 34 estimates a state of charge for the given battery cell based on the measured voltage for the given battery cell and the measured discharge current for the given battery cell. The estimation module 34 then estimates an internal resistance for the given battery cell based on the measured voltage for the given battery cell and the measured discharge current for the given cell.

For example, the estimation module 34 may estimate the internal resistance for the given battery cell to be equal to the measured output voltage for the given battery cell divided by the measured discharge current for the given battery cell. The estimation module 34 then estimates an open-circuit voltage for the given cell based on the measured output voltage for the given battery cell, the measured discharge current for the given battery cell, and the estimated internal resistance for the given battery cell. For example, the estimation module 34 may estimate the open-circuit voltage to be equal to the measured output voltage for the given battery cell plus the product of the measured discharge current for the given battery cell and the estimated internal resistance for the given battery cell.

At 210, the method 200 receives a vehicle power requirement for an electric vehicle associated with the plurality of battery cells. For example, the power control module 38, as described above, receives a vehicle power requirement associated with the EV. At 212, the power control module 38 determines a target output voltage for the given battery cell based on the vehicle power requirement. For example, the power control module 38 compares the vehicle power requirement to a high power threshold. The high power threshold may be a predetermined value. In some examples, the high power threshold is selected based on a charge rate of the given battery cell. By way of non-limiting example, if charger rate of 4 v-3 Ah (amp-hours), then a current limit for the given battery is equal to 3 A. Accordingly, the power limit would be 12 W (i.e., 4V*3 A). It is understood that the power threshold may be determined in any suitable manner and be any suitable value.

When the power control module 38 determines the vehicle power requirement is greater than the high power threshold, the power control module 38 sets the target output voltage for the given battery cell equal to the measured voltage plus a voltage offset (e.g., equal to 0.1 volt).

Conversely, when the power control module 38 determines the vehicle power requirement is not greater than the high power threshold, the power control module 38 sets the target output voltage for the given battery cell equal to a lower bound of voltage supplied by the plurality of battery cells ($V_{app}$). The lower bound voltage may be any suitable value associated with the battery pack.

At 214, the method 200 determines a target discharge current for the given battery cell. For example, the power control module 38 a discharge rate no larger than ($I_{dlim}$) for reduction of inefficient energy dissipation. Suppose $$\left(I_{dlim} \leq \frac{P_{req}}{N \cdot V_{tot}}\right)$$

holds, where ($P_{req}$) is the required power, N is the number of parallel-connected cells, and ($V_{tot}$) is the total output voltage. Then, by making each cell discharged at $$\frac{I_{tot}}{N},$$

the power control module 38 can supply the required power without excessive heat dissipation, where ($I_{tot}$) is total discharge current. The power control module 38 sets the target discharge current for the given battery cell based on the state of charge when the level of power requirement is satisfied. Therefore, the power control module 38 sets the target discharge current to $$\frac{I_{tot}}{N} \text{ if } I_{dlim} \leq \frac{P_{req}}{N \cdot V_{tot}}$$

holds, and $$I_{tot} \frac{SoC}{\Sigma SoC}$$

otherwise, which is recorded as $$I_d = \begin{cases} \frac{I_{tot}}{N}, & \text{if } I_{dlim} \leq \frac{P_{req}}{N \cdot V_{tot}} \\ I_{tot} \frac{SoC}{\Sigma SoC}, & \text{otherwise} \end{cases}.$$

At 220, the method determines a target internal resistance for the given battery cell. For example, the power control module 38 determines a different between the estimated open-circuit voltage for the given battery cell and the target output voltage for the given battery cell. The power control module 38 then divides the difference by the target discharge current for the given battery cell. At 222, the method 200 determines a target cell temperature for the given battery cell based. As described above, the cell temperature control module 42 determines the target cell temperature for the given battery cell based on the target internal resistance for the given battery cell.

At 224, the method 200 determines a target ambient temperature for the given battery cell. For example, the cell temperature control module 42 determines a target ambient temperature for the given battery cell as a function of a target cell temperature for the given battery cell, a measured cell temperature for the given battery cell, the target internal resistance for the given battery cell, and the target discharge current for the given battery cell. For example, the cell temperature control module 42 solves for the ambient temperature for the given battery cell based on the following:

Target $T_{cell} = T_{cell} + \Delta t[c1(T_{cell} - T_{amb}) + c2R_{int}I_d^2]$ By way of non-limiting example only, assuming Target $T_{cell}$=30 C, $T_{cell}$=32 C, $\Delta t$=1, $R_{int}$=1 Ohm, Id=1 A, c1=−1, and c2=1, then $T_{amb}$=29 C.

At 226, the method 200 determines a target temperature for a thermal fin associated with the given battery cell. For example, the cell temperature control module 42 determines the target temperature for the thermal fin based on the target ambient temperature and the target cell temperature for the given battery cell. The cell temperature control module 42 estimates the impact of thermal fins on cell temperature based on a contact area between the given battery cell and the associated thermal fin. For example, the thermal fin covers a half of battery surface of the given battery cell. In other words, the cell temperature of the given battery cell would be affected by the thermal fin temperature and ambient temperature evenly. Each battery cell of the plurality of battery cells has a number of thermal fin blocks and a number of surface area blocks. In other words, the thermal fins associated with the plurality of battery cells include a plurality of fin portions and recessed portions. The fin portions cover a portion of the surface of the battery cell, while the recessed portions leave a portion of the surface of the battery cell exposed.

In this manner, the ambient temperature around the given battery cell and a temperature of the thermal fin associated with the given battery cell, affect the cell temperature of the given battery cell. Accordingly, controlling the temperature of the thermal fin associated with the given battery cell, affects the cell temperature of the given battery cell. The cell temperature control module 42 determines the target temperature for the thermal fin associated with the given cell based on the following relationship:

$$T_{amb}=1/n\Sigma(\text{temperature around cell including } T_{fin})=$$
$$1/n(\text{number of non-thermal fin blocks}*T_{amb}+$$
$$\text{number of thermal fin blocks}*T_{fin})$$

Where $T_{amb}$ is the target ambient temperature determined above, $T_{fin}$ is the target temperature of the thermal fin, n is the number of battery cells in the plurality of battery cells, the number of thermal fin blocks is equal to the number of fin portions of the thermal fin, and the number of non-thermal fin blocks is equal to the number of recessed portions of the thermal fin.

In one example, the number of thermal fin blocks may be equal to 6, the number of non-thermal fin blocks may be equal to 12, and the total number of battery cells in the plurality of battery cells is equal to 18. It is understood the values above are for illustrative purposes only and may be any suitable value. Continuing with the example above where Tamb=29 C=1/18 (35*12+$T_{fin}$*6). Solving for the target $T_{fin}$=17 C.

At 228, the method 200 receives a measured temperature of the thermal fin associated with the given battery cell. For example, the cell temperature control module 42 receives a measured temperature for the thermal fin from one of the plurality of cell sensors associated with the given cell. At 234, the cell temperature control module 42 determines whether the target temperature for the thermal fin is greater than the measured temperature of the thermal fin. When the cell temperature control module 42 determines the target temperature for the thermal fin is greater than the measured temperature of the thermal fin, the cell temperature control module 42 directs the coolant controller 40 to direct heated coolant to the thermal fin associated with the given battery cell. In this manner, the cell temperature control module 42 increases the temperature of the given battery cell.

Conversely, when the cell temperature control module 42 determines the target temperature of the thermal fin is less than the measured temperature of the thermal fin, the cell temperature control module 42 directs the coolant controller 40 to direct cool coolant to the thermal fin associated with the given battery cell. In this manner, the cell temperature control module 42 decreases the temperature of the given battery cell.

At 240, the method 200 measures a present temperature of the given battery cell. For example, a cell sensor associated with the given battery cell measures a present temperature of the given cell. The cell temperature control module 42 receives the measured temperature of the given battery cell. At 244, the cell temperature control module 42 determines whether the measured temperature of the given battery cell is greater than a temperature threshold. When the cell temperature control module 42 determines the measured temperature of the given battery cell is greater than the temperature threshold, the cell temperature control module 42 instructs the coolant controller 40 to direct cool coolant to the thermal fin associated with the given battery cell, thereby decreasing the temperature of the given battery cell.

The method 200 ends when the cell temperature control module 42 determines the measured temperature of the given battery cell is below the temperature threshold. It is understood that while only a given battery cell is described, the method 200, and the principles of the present disclosure apply to each of the plurality of battery cells. It is understood that the principles disclosed with respect to FIGS. 6a-6b apply to all battery modules associated with the electric vehicle.

In this way, the BTMS 100 meets R1-R5. The BTMS's 100 basic principle is to heat (cool) cells 20 to be high-discharged (rested or low-discharged). Based on each cell's 20 SoC and the required power, the BTMS 100 determines the type of coolant for each cell 20 to realize the principle and achieve this goal.

A particular example embodiment implemented by the BTMS 100 is set forth in the algorithm below.

---

Algorithm 1 Algorithm for thermal management after starting operation

```
1:   for Each module do
2:      measure V_o
3:      for Each cell X (the n-th cell) in the module do
4:         measure I_d[n] and T_cell[n];
5:         estimate SoC[n], V_oc[n] and R_int[n];
6:      end for
7:      if High power is required then
8:         increase V_o;
9:      else
10:        decrease V_o;
11:     end if
12:     for Each cell X (the n-th cell) in the module do
13:        choose efficient I_d[n];
14:        choose R_int[n] from Eq. (1);
15.        choose T_cell[n] from Eq. (3);
16:        choose T_fin[n] from Eq. (6) and thermal distribution in a pack;
17:        if T_fin[n] ≥ previous T_fin[n] then
18:           HeatingSet ← HeatingSet U {X}
19:        else
20:           CoolingSet ← CoolingSet U {X};
21:        end if
22:        if T_cell[n] ≥ T_up then
23:           CoolingSet ← CoolingSet U {X};
24.           HeatingSet ← HeatingSet \ {X}
25:        end if
26:     end for
27:  end for
```

---

The BTMS 100 update all the states of battery cells 20 in a pack to support the following steps. The BTMS 100 directly measures each cell's 20 output voltage and current via sensors 28, and then estimate the cell's 20 SoC, $R_{int}$, and $V_{oc}$ based on the measured values.

The BTMS 100 sets target output voltage. For example, as described above, the power control module 38 regulates the target output voltage ($V_o$) based on the power requirements. Increasing $V_o$ helps power the vehicle because the following steps heat the battery cells 20 to reduce internal resistance in order to supply the target output voltage. Unfortunately, the power requirement may change abruptly (e.g., due to sudden acceleration or deceleration of the vehicle) and thermal control takes time. Therefore, the BTMS 100 predicts the power requirement by analyzing the driving patterns before segmenting the driving path for effective management in the subsequent steps.

The BTMS 100 then calculates the target discharge current. For example, the power control module 38 calculates efficient discharge current ($I_d$) of cells 20 for small heat dissipation and SoC balancing. As discussed in R5, the power control module 38 sets each of the cells 20 discharge rate no larger than ($I_{dlim}$) for reduction of inefficient energy dissipation. Suppose $$\left(I_{dlim} \leq \frac{P_{req}}{N \cdot V_{tot}}\right)$$

holds, where ($P_{req}$) is the required power, N is the number of parallel-connected cells, and ($V_{tot}$) is the total output voltage. Then, by making each cell discharged at $$\frac{I_{tot}}{N},$$

the power control module 38 can supply the required power without excessive heat dissipation, where ($I_{tot}$) is total discharge current. To meet R4, the power control module 38 sets ($I_d$) based on the SoC when the level of power requirement ($P_{req}$) is satisfied; cells 20 with higher SoC should work more. Therefore, the power control module 38 sets the discharge current $$(I_d) \text{ to } \frac{I_{tot}}{N} \text{ if } I_{dlim} \leq \frac{P_{req}}{N \cdot V_{tot}}$$

holds, and $$I_{tot} \frac{SoC}{\Sigma Soc}$$

otherwise, which is recorded as $$I_d = \begin{cases} \frac{I_{tot}}{N}, & \text{if } I_{dlim} \leq \frac{P_{req}}{N \cdot V_{tot}} \\ I_{tot} \frac{SoC}{\Sigma Soc}, & \text{otherwise} \end{cases}.$$

The BTMS 100 calculates a required temperature for each of the thermal fins 24. After setting $I_d$ and $V_o$, the cell 20 temperature control module 42 can calculate the required $R_{int}$ and $T_{cell}$ from Eqs. (1) and (3) as:

$$c^3 T_{cell}^3 + c_2 T_{cell}^2 + c_1 T_{cell} + c_0 = R_{int} = \frac{V_{oc} - V_o}{I_d},$$

while Eq. (6) calculates the desirable ambient temperature ($T_{amb}$).

Figure 13:
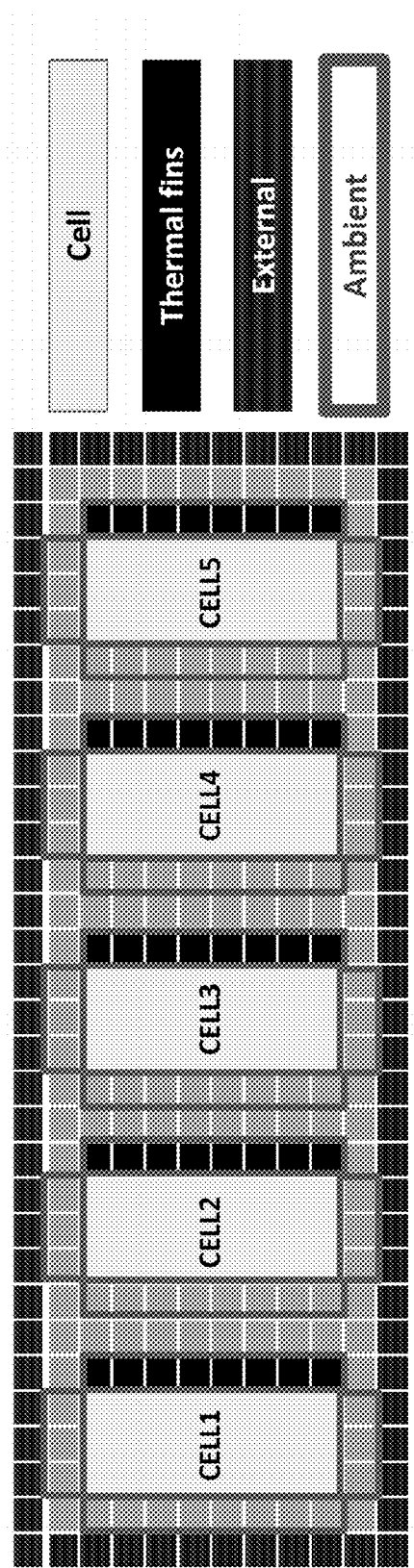
FIG. 13 is a diagram depicting temperature distribution and ambient temperature of cells in a battery pack.

Cell 20 temperature depends on ambient temperature including the temperature of thermal fins 24, and cell temperature control module 38 can estimate the ambient temperature by updating temperature distribution in a battery module 10 as shown in FIG. 13. Note that the temperature distribution can be calculated from the basic heat transfer equation (8) and temperatures measured by sensors 28 in a battery module 10. Based on the temperature distribution, the cell temperature control module 38 can determine the temperature for each of the thermal fins 24 that achieve the target ambient temperature.

The BTMS 100 select the coolant type for thermal fins 24 and determines the coolant type (heated or cooled) for cells 20 based on current and required thermal fin 24 temperatures. The cell temperature control module 42 determines which of the cells 20 has a present temperature that is higher than the upper limit, and move them from HeatingSet to maintain thermal stability.

As discussed earlier, the way of calculating $I_d$ addresses R4 and R5. Then, all the steps will meet R2 and R3, since cells 20 are heated (cooled) when they need high power (otherwise). The final step guarantees R1. So, Algorithm 1 meets R1-R5.

Figure 14:
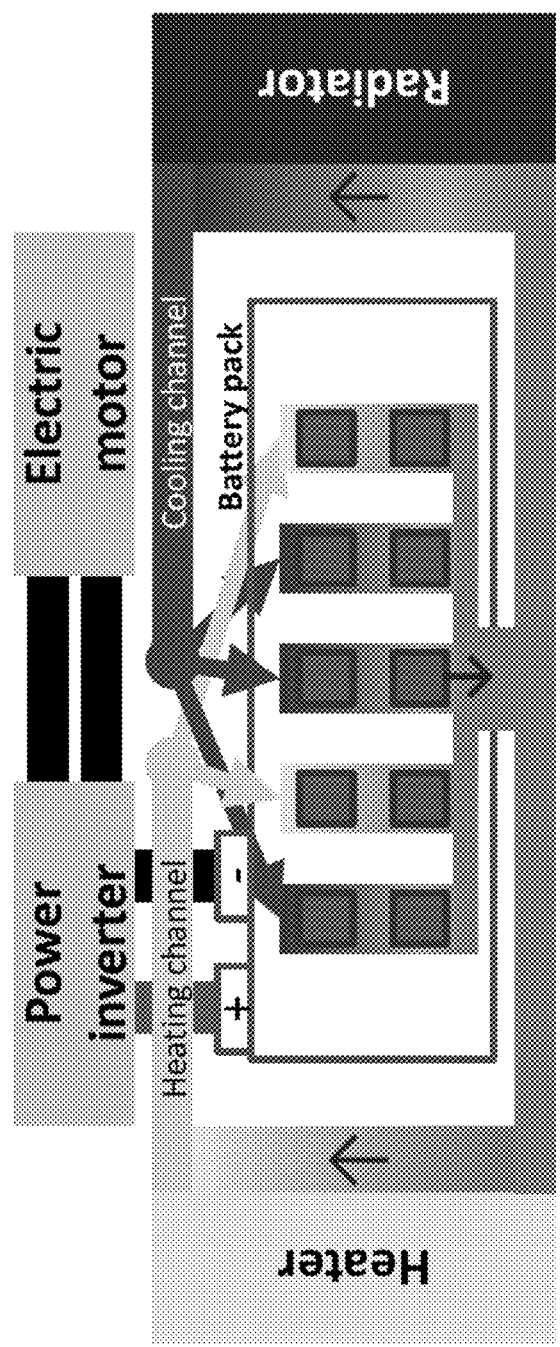
FIG. 14 is a diagram depicting thermal management for battery packs.

R1-R3 can be met by the existing thermal architecture, since it can regulate the temperature of battery cells 20 in a timely manner. To satisfy R4 and R5, the BTMS 100 controls coolant architecture which can cool and/or heat each cell 20 selectively as shown in FIG. 14. The coolant architecture is not much different from existing coolant architectures. While existing BMSes are already equipped with the heating and/or cooling capability, the present coolant architecture adds more coolant flow valves between the heating and/or cooling channel and the thermal fins 24 for each cell 20, as shown in FIG. 14. Each coolant control valve should be able to select the type (either heating or cooling of coolant for cells.

Figure 15:
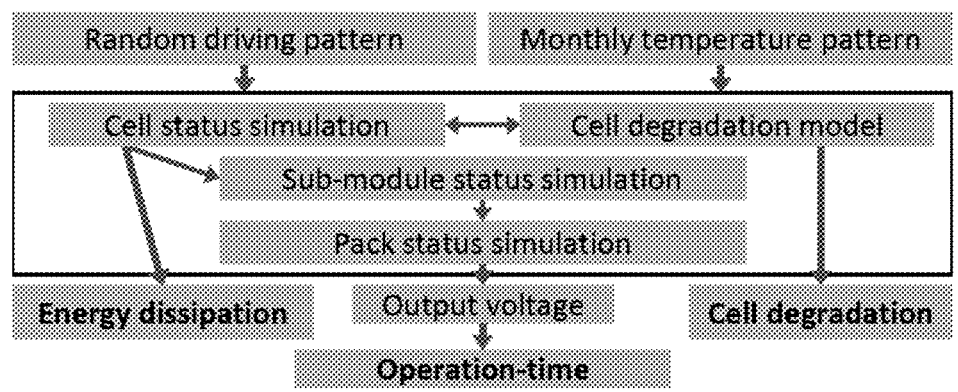
FIG. 15 is a diagram showing example evaluation tool.

With references to FIG. 15 an overview of a battery test simulation is shown generally. Dualfoil5 is a popular battery simulator written in Fortran, and can simulate various types of batteries including lithium-metal, lithium-ion, and sodium-ion batteries. The program reads the load profile as a sequence of constant current steps, and the battery lifetime is obtained from the output by reading off the time at which the cell potential drops below the cutoff voltage. The equations and methods used in the program rely on an electrochemical model that describes the charge and discharge of a lithium ion battery developed by Marc Doyle et al.

To acquire realistic power requirements, US driving patterns are exploited, a daily driving pattern model, and CarSim. CarSim is a well-known and widely-used vehicle modeling tool, simulating the dynamic behavior of vehicles under specified driving conditions, and calculating the required power during driving.

Figure 16:
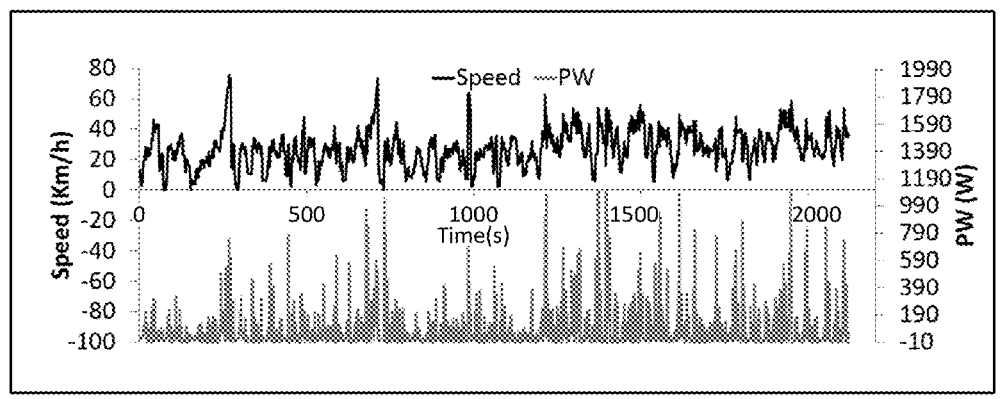
FIG. 16 is a graph showing speed and power requirement profiles.

First, a daily driving pattern model with a set of US real driving patterns yields daily driving patterns. These daily driving patterns are then fed to CarSim to generate the power requirement. FIG. 16 shows a set of speed and power requirement profiles generated by this process.

Evaluating the following three thermal management schemes

1) BASE: no thermal management;
2) EX: existing approaches described above (pack-level cooling/heating only for thermal stability); and
2) MSC: our thermal management described above (active cell-level cooling/heating for efficient BMSes).

For these evaluations, the simulation generated realistic driving and external temperature profiles before simulating the behavior of a battery system with the above three schemes. The three metrics described above are then extracted from the simulation results.

Figure 17:
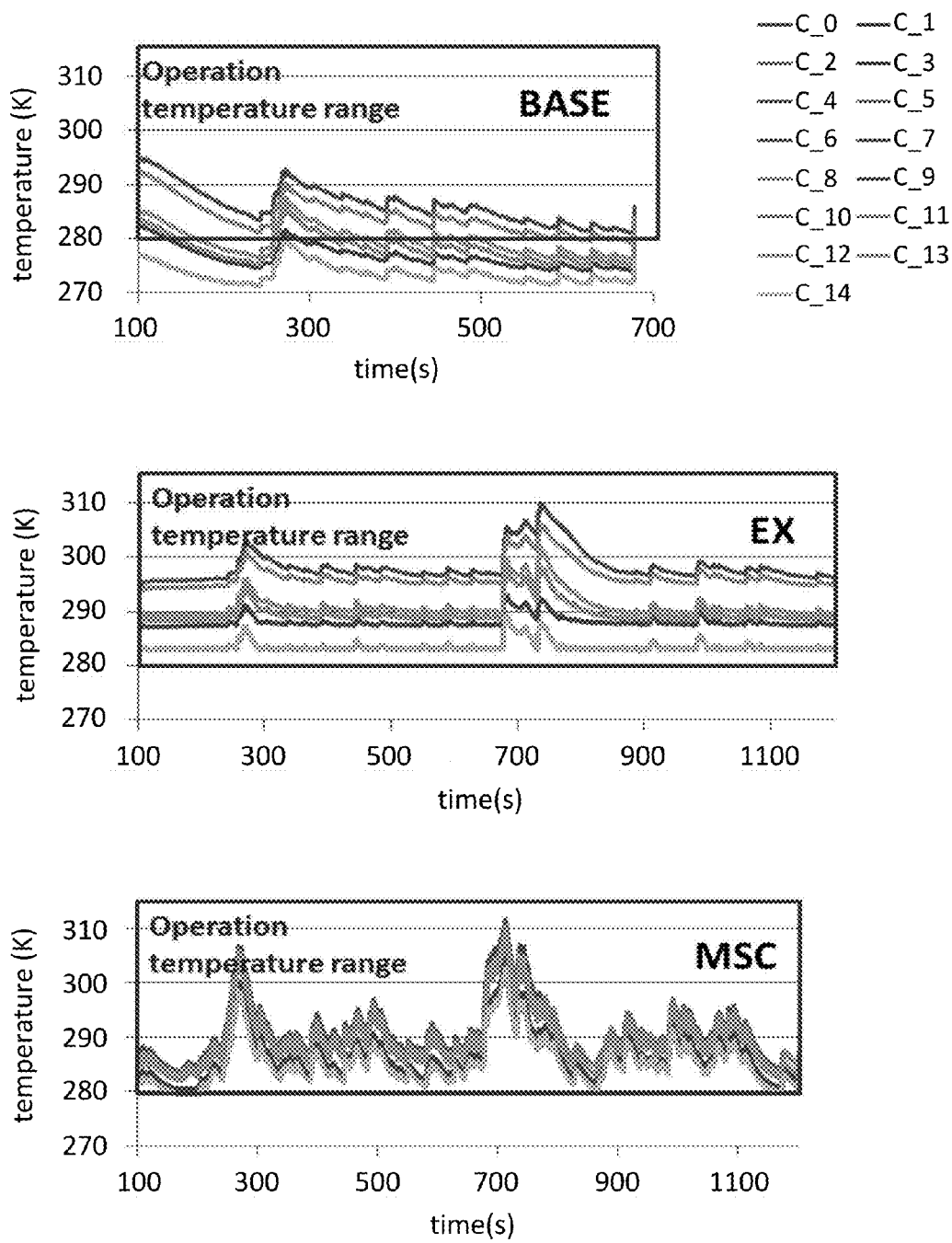
FIG. 17 are graphs showing examples of thermal management in Anchorage, Ak. (AC)

The simulation and extracted operation-times are run for each scheme under various stress conditions. Average operation-times are then calculated to show the overall performance of each scheme. Table 1 shows the ratio of the average operation-time of MSC (and EX), to that of BASE. As shown in the Table 1, MSC improves the operation-time by up to 204% and 58.4%, respectively over BASE and EX. Also, MSC keeps all the batteries within a tolerable temperature range to prevent explosion or malfunction as shown in FIG. 17; some batteries operate at extremely cold temperature under BASE, potentially leading to malfunction or inefficient usage of the battery pack, whereas all the cells in a pack operate within a tolerable temperature range under MSC and EX.

TABLE 1

Average operation-time

| City, Month | Average $t_{op}$ (Sec) | | |
|---|---|---|---|
| | AC | AA | PH |
| EX/BASE | 1.92 | 0.92 | 1.03 |
| MSC/BASE | 3.04 | 1.4 | 1.62 |

From Table 1, it can be observed that MSC's improvement in AC is more pronounced than that in AA and PH, because there is more room for performance improvement in colder areas, which we will elaborate on later. As shown in Table 1, MSC effectively exploits such room for improvement. For a more detailed analysis for the improvement of MSC, energy dissipation and performance degradation can be investigated in the following.

The BTMS 100 includes several methods to decrease energy dissipation. They actually contribute to the extension of operation-time, since reducing energy dissipation increases available energy in the cells 20, which, in turn, extends the operation-time.

Figure 18:
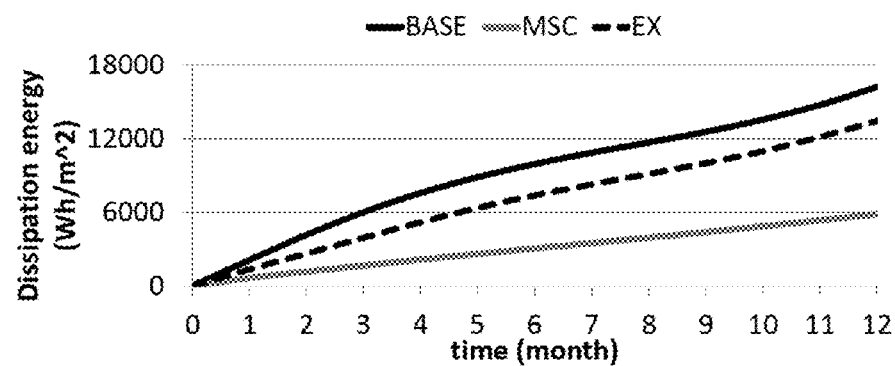
FIG. 18 is a graph showing cumulative energy dissipation for one-year operation in Ann Arbor, Mich. (AA)

Comparing the energy dissipation of the three thermal management schemes when the car operates in AC, AA and PH, Table 2 shows energy dissipation when drivers operate their cars repeating the same driving pattern every day for a year. FIG. 18 shows an example energy dissipation of each management scheme. Compared to BASE, MSC reduces energy dissipation by 70.6% in AC, 63.8% in AA, and 48.4% in PH. MSC is even better than EX in that it can reduce more energy dissipation by up to 58.6% than EX. This reduction of energy dissipation extends the operation-time under MSC.

TABLE 2

Energy dissipation after one year of operation

| City | Cumulative energy dissipation (Wh/m$^2$) | | |
|---|---|---|---|
| | AC | AA | PH |
| BASE | 20978 | 16216 | 10474 |
| EX | 14910 | 13450 | 9976.5 |
| MSC | 6167.5 | 5864.6 | 5403.5 |

An interesting point to note is that the difference between energy dissipation of MSC (or EX) and that of BASE is significant in AC. This can be reasoned as follows. In a hotter area, the efficiency is higher (or smaller energy dissipation) even without any thermal management (i.e., BASE), because high temperature increases the chemical reaction rate in a battery. So, in AC where temperature is extremely low in winter, MSC and EX heat the cells to attain effective operation temperature; we observe from FIG. 17 that EX and MSC yield a tolerable temperature range for battery cells. This reduces energy dissipation.

MSC reduces energy dissipation significantly more than EX, since it not only timely cools and/or heats the cells 20 in order to reduce energy dissipation, but also selectively cools and/or heats the cells 20 for SoC equalization. There-fore, each cell 20 operates more efficiently under MSC, by reducing temperature differences between cells 20. The reduction of energy dissipation is one of the dominant reasons for improving the operation-time.

The degree of battery performance degradation depends on its cumulative exposure to high temperature. To evaluate the performance degradation, each of the cells 20 are compared for degradation levels, which are represented by relative resistance and the absolute value of internal resistance, under each thermal management scheme in AC, AA and PH during a 1-year period.

Figure 19A:
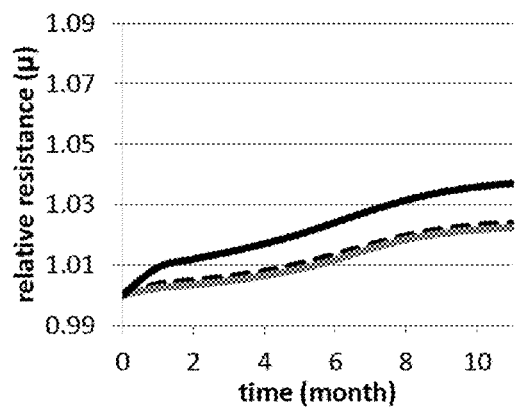
FIGS. 19A-B are graphs showing relative resistance and internal resistance in AA.
Figure 19B:
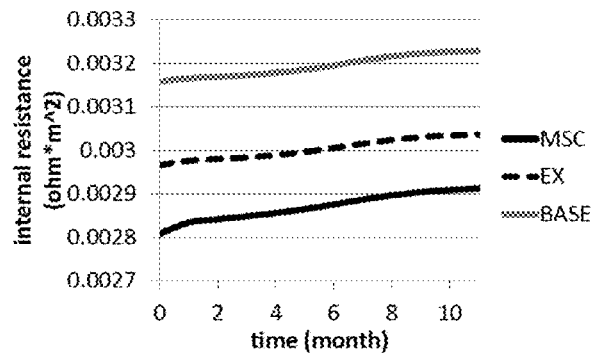

FIGS. 19 (a) and (b) plot relative resistance and the absolute value of internal resistance, respectively. As shown in FIG. 19(a), MSC leads to a little bit faster degradation than the other schemes, because MSC actively cools and/or heats each cell 20. However, such active control reduces the absolute value of internal resistance; as shown in FIG. 19(b), internal resistance after one-year usage under MSC is smaller than that under other schemes. This implies that MSC, despite higher relative resistance, is still more efficient for up to one year. These results validate an increase of operation-time discussed earlier, i.e., MSC is efficient in using a battery pack.

The BTMS 100 is constructed based on the existing thermal management system for cooling and heating engines and batteries in the current vehicles on the market. To implement the BTMS 100, some hardware should be installed in each battery module 10. Measuring the output voltage and discharge current of cells 20 requires sensors 28, as other BMSes do. Additional control flow valves are also required to cell-level thermal controls; their performance should be considered since they directly affect the effectiveness of battery management.

To resolve increasing demand to make EVs less expensive and safer, BMSes should cope with thermal and general issues that affect efficiency and reliability of BMSes. A thermal management is the key to addressing these issues, since temperature has significant impact on electrical states of BMSes. The present disclosure has presented how to achieve efficient and reliable BMSes using thermal controls. The BTMS 100 cools and/or heats battery cells 20 timely and selectively based on the analysis for impacts of power requirements and temperature variation on electrical states of battery cells 20. To support this scheme, we also proposed thermal management architecture, which is able to cool and/or heat battery cells 20 selectively.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A real-time thermal management method for a plurality of battery cells in an electric vehicle, comprising:
    estimating, for a given battery cell of the plurality of battery cells, an internal resistance based on a measured output voltage of the given battery cell and a measured discharge current of the given battery cell;
    estimating, for the given battery cell, an open-circuit voltage based on the estimated internal resistance for the given battery cell;
    determining a target output voltage for the given battery cell based on a vehicle power requirement associated with the electric vehicle;
    determining a target discharge current for the given battery cell as a function of an estimated state of charge for the given battery cell, a total measured discharge current for the plurality of battery cells, and a total estimated state of charge for the plurality of battery cells;
    determining a target internal resistance for the given battery cell based on the estimated open-circuit voltage for the given battery cell, the target output voltage for the given battery cell, and the target discharge current for the given battery cell;
    determining a target cell temperature for the given battery cell based on the target internal resistance for the given battery cell; and
    controlling a flow of coolant adjacent to the given battery cell based on the target temperature for the given battery cell.

2. The method of claim 1 further comprising estimating the open-circuit voltage for the given battery cell based on the measured voltage for the given battery cell plus the product of the measured discharge current for the given battery cell and the estimated internal resistance for the given battery cell.

3. The method of claim 1 further comprising determining whether the vehicle power requirement divided a product of a total number of battery cells in the plurality of battery cells and a total measured output voltage for the plurality of battery cells is less than a predefined discharge current rate limit for the given cell.

4. The method of claim 3 further comprising setting the target discharge current for the given battery cell equal to a product of a total measured discharge current for the plurality of battery cells and a ratio of the estimated state of charge for the given battery cell and a total estimated state of charge for the plurality of battery cells in response to a determination that the vehicle power requirement divided the product of a total number of battery cells in the plurality of battery cells and the total measured output voltage for the plurality of battery cells is less than a predefined discharge current rate limit for the given battery cell.

5. The method of claim 3 further comprising setting the target discharge current for the given battery cell equal to a total measured discharge current for the plurality of battery cells divided by the total number of battery cells in response to a determination that the vehicle power requirement divided the product of a total number of battery cells in the plurality of battery cells and the total measured output voltage for the plurality of battery cells is not less than a predefined discharge current rate limit for the given battery cell.

6. The method of claim 1 further comprising determining a target ambient temperature associated with the given battery cell as a function of a measured cell temperature of the given battery cell, the target internal resistance for the given battery cell, and the target discharge current for the given battery cell.

7. The method of claim 6 further comprising determining a target temperature for a thermal fin associated with the given battery cell as a function of the measured cell temperature of the given battery cell, the target cell temperature for the given battery cell, and the target ambient temperature for the given battery cell.

8. The method of claim 7 further comprising comparing the target temperature for the thermal fin with a measured temperature of the thermal fin.

9. The method of claim 8 further comprising controlling flow of cool coolant adjacent to the given battery cell in response to a determination that the target temperature for the thermal fin is less than the measured temperature of the thermal fin.

10. The method of claim 8 further comprising controlling flow of heated coolant adjacent to the given battery cell in response to a determination that the target temperature for the thermal fin is greater than the measured temperature of the thermal fin.

11. A real-time thermal management system for a plurality of battery cells in an electric vehicle, comprising;
a coolant controller that directs coolant adjacent to each of the plurality of battery cells;
an estimation module that:
estimates, for a given battery cell of the plurality of battery cells, an internal resistance based on a measured output voltage of the given battery cell and a measured discharge current of the given battery cell; and
estimates, for the given battery cell, an open-circuit voltage based on the estimated internal resistance for the given battery cell;
a power control module that:
determines a target output voltage for the given battery cell based on a vehicle power requirement associated with the electric vehicle;
determines a target discharge current for the given battery cell as a function of an estimated state of charge for the given battery cell, a total measured discharge current for the plurality of battery cells, and a total estimated state of charge for the plurality of battery cells; and
determines a target internal resistance for the given battery cell based on the estimated open-circuit voltage for the given battery cell, the target output voltage for the given battery cell, and the target discharge current for the given battery cell; and
a cell temperature control module that determines a target cell temperature for the given battery cell based on the target internal resistance for the given battery cell and selectively instructs the coolant controller to direct a flow of coolant adjacent to the given battery cell based on the target temperature for the given battery cell.

12. The system of claim 11 wherein the estimation module estimates the open-circuit voltage for the given battery cell based on the measured voltage for the given battery cell plus the product of the measured discharge current for the given battery cell and the estimated internal resistance for the given battery cell.

13. The system of claim 11 wherein the power control module determines whether the vehicle power requirement divided a product of a total number of battery cells in the plurality of battery cells and a total measured output voltage for the plurality of battery cells is less than a predefined discharge current rate limit for the given cell.

14. The system of claim 13 wherein the power control module sets the target discharge current for the given battery cell equal to a product of a total measured discharge current for the plurality of battery cells and a ratio of the estimated state of charge for the given battery cell and a total estimated state of charge for the plurality of battery cells in response to a determination that the vehicle power requirement divided the product of a total number of battery cells in the plurality of battery cells and the total measured output voltage for the plurality of battery cells is less than a predefined discharge current rate limit for the given battery cell.

15. The system of claim 13 wherein the power control module sets the target discharge current for the given battery cell equal to a total measured discharge current for the plurality of battery cells divided by the total number of battery cells in response to a determination that the vehicle power requirement divided the product of a total number of battery cells in the plurality of battery cells and the total measured output voltage for the plurality of battery cells is not less than a predefined discharge current rate limit for the given battery cell.

16. The system of claim 11 wherein the cell temperature control module determines a target ambient temperature associated with the given battery cell as a function of a measured cell temperature of the given battery cell, the target internal resistance for the given battery cell, and the target discharge current for the given battery cell.

17. The system of claim 16 wherein the cell temperature control module determines a target temperature for a thermal fin associated with the given battery cell as a function of the measured cell temperature of the given battery cell, the target cell temperature for the given battery cell, and the target ambient temperature for the given battery cell.

18. The system of claim 17 wherein the cell temperature control module compares the target temperature for the thermal fin with a measured temperature of the thermal fin.

19. The system of claim 18 wherein the cell temperature control module instructs the coolant controller to direct flow of cool coolant adjacent to the given battery cell in response to a determination that the target temperature for the thermal fin is less than the measured temperature of the thermal fin.

20. The system of claim 18 wherein the cell temperature control module instructs the coolant controller to direct flow of heated coolant adjacent to the given battery cell in response to a determination that the target temperature for the thermal fin is greater than the measured temperature of the thermal fin.

21. A real-time thermal management method for a plurality of battery cells in an electric vehicle, comprising:
receiving, via a plurality of cell sensors, a measured output voltage for a given battery cell of the plurality of battery cells;
receiving, via the plurality of cell sensors, a measured discharge current for the given battery cell;
receiving, via the plurality of cell sensors, a measured cell temperature for the given battery cell;
estimating, based on the measured output voltage and the measured discharge current, a state of charge for the given battery cell;
estimating, based on the measured output voltage and the measured discharge current, an internal resistance for the given battery cell;
estimating an open-circuit voltage for the given battery cell based on the measured output voltage, the measured discharge current, and the estimated internal resistance;
receiving a vehicle power requirement for the electric vehicle;
determining a target output voltage for the given battery cell based on the vehicle power requirement;
determining a target discharge current for the given battery cell as a function of the estimated state of charge for the given battery cell, a total measured discharge current for the plurality of battery cells, and a total state of charge for the plurality of battery cells;

determining a target internal resistance for the given battery cell based on the estimated open-circuit voltage for the given battery cell, the target output voltage for the given battery cell, and target discharge current for the given battery cell;

determining a target cell temperature for the given battery cell based on the target internal resistance for the given battery cell;

comparing, for the given battery cell, the target cell temperature and the measured cell temperature; and controlling a flow of coolant adjacent to the given battery cell in response to the comparison between the target cell temperature and the measured cell temperature.

* * * * *